US009053478B2

(12) United States Patent
Soffer et al.

(10) Patent No.: US 9,053,478 B2
(45) Date of Patent: Jun. 9, 2015

(54) MOBILE COMMERCE SYSTEM

(75) Inventors: Dan Soffer, Tel Aviv (IL); Yoav Elgrichi, Singapore (SG); Kay Hong Ng, Singapore (SG); Siang-Thye Khow, Singapore (SG); Benjamin Chua, Singapore (SG); Rolf Salomon, Shoham (IL); Itiel-Meir Maayan-Vilian, Shoham (IL)

(73) Assignee: VERIFONE, INC., San Jose, CA (US)

( * ) Notice: Subject to any disclaimer, the term of this patent is extended or adjusted under 35 U.S.C. 154(b) by 0 days.

(21) Appl. No.: 13/434,220

(22) Filed: Mar. 29, 2012

(65) Prior Publication Data

US 2012/0284131 A1 Nov. 8, 2012

Related U.S. Application Data

(60) Provisional application No. 61/481,842, filed on May 3, 2011.

(51) Int. Cl.
*G06Q 20/32* (2012.01)
*G06Q 20/36* (2012.01)
*G06Q 20/20* (2012.01)

(52) U.S. Cl.
CPC ........... *G06Q 20/3278* (2013.01); *G06Q 20/36* (2013.01); *G06Q 20/202* (2013.01)

(58) Field of Classification Search
CPC ... G06Q 20/204; G06Q 20/20; G06Q 20/202; G06Q 20/322; G06Q 20/40
USPC ................................................ 33/17; 705/17
See application file for complete search history.

(56) References Cited

U.S. PATENT DOCUMENTS

| 4,924,078 A | 5/1990 | Sant'Anselmo |
| 5,026,398 A | 6/1991 | May |

(Continued)

FOREIGN PATENT DOCUMENTS

| CN | 101499190 | 8/2009 |
| CN | 101567108 | 10/2009 |

(Continued)

OTHER PUBLICATIONS

Spanoudis, S L SPE. Escaping Captivity. ANTEC 2011. Proceedings of the 69th SPE Annual Technical Conference held Boston, Ma., May 1-5, 2011.*

(Continued)

*Primary Examiner* — Ryan Zeender
*Assistant Examiner* — Fawaad Haider
(74) *Attorney, Agent, or Firm* — Sughrue Mion, PLLC

(57) ABSTRACT

A mobile commerce system including a multiplicity of Mobile Device-Point of Sale Communication (MPC)-equipped mobile devices, a plurality of MPC-enabled Point-of-Sale (POS) devices, at least one POS configuration server for configuring the plurality of MPC-enabled POS devices, at least one MPC-equipped mobile device configuration server for configuring the plurality of MPC-equipped mobile devices and at least one mobile marketing platform server operative to introduce Transaction Value Certificate (TVC)-related functions and to communicate both with the at least one POS configuration server and the at least one MPC-equipped mobile device configuration server to coordinate operation thereof so that the MPC-enabled POS devices will be "tap-ready" for carrying out the TVC-related functions.

5 Claims, 25 Drawing Sheets

(56) References Cited

U.S. PATENT DOCUMENTS

| | | |
|---|---|---|
| 5,353,219 A | 10/1994 | Mueller |
| 5,973,619 A | 10/1999 | Paredes |
| 6,456,207 B1 | 9/2002 | Yen |
| 6,726,094 B1 | 4/2004 | Rantze |
| 6,756,913 B1 | 6/2004 | Ayed |
| 6,882,290 B2 | 4/2005 | French et al. |
| 6,997,384 B2 | 2/2006 | Hara |
| 7,275,038 B1 | 9/2007 | Weinstock et al. |
| 7,392,388 B2 | 6/2008 | Keech |
| 7,707,113 B1 | 4/2010 | DiMartino |
| 7,784,864 B2 | 8/2010 | Feder |
| 7,934,641 B2 | 5/2011 | Melick |
| 7,958,555 B1 | 6/2011 | Chen |
| 7,963,597 B2 | 6/2011 | Bostrom |
| 8,220,047 B1 | 7/2012 | Soghoian |
| 8,353,451 B2 | 1/2013 | Rothwell |
| 8,438,066 B1 | 5/2013 | Yuen et al. |
| 8,775,814 B2 | 7/2014 | Bidare |
| 2002/0077993 A1 | 6/2002 | Immonen |
| 2002/0116257 A1 | 8/2002 | Helbig |
| 2002/0175254 A1 | 11/2002 | Lee |
| 2002/0194081 A1 | 12/2002 | Perkowski |
| 2002/0195495 A1 | 12/2002 | Melick |
| 2003/0020081 A1 | 1/2003 | Guida |
| 2003/0037236 A1 | 2/2003 | Simon |
| 2003/0068988 A1 | 4/2003 | Janninck |
| 2003/0119554 A1 | 6/2003 | Horn |
| 2003/0126095 A1 | 7/2003 | Allen |
| 2003/0144906 A1 | 7/2003 | Fujimoto et al. |
| 2003/0172028 A1 | 9/2003 | Abell |
| 2004/0119589 A1 | 6/2004 | French et al. |
| 2004/0128197 A1 | 7/2004 | Bam et al. |
| 2004/0185854 A1 | 9/2004 | Artola |
| 2004/0249712 A1 | 12/2004 | Brown et al. |
| 2004/0267618 A1 | 12/2004 | De Judicibus |
| 2005/0035208 A1 | 2/2005 | Elliot |
| 2005/0038787 A1 | 2/2005 | Cheung |
| 2005/0071179 A1 | 3/2005 | Peters |
| 2005/0203854 A1 | 9/2005 | Das |
| 2005/0211771 A1 | 9/2005 | Onozu |
| 2006/0144946 A1 | 7/2006 | Kuriyama |
| 2006/0224456 A1 | 10/2006 | Walker et al. |
| 2006/0253335 A1 | 11/2006 | Keena |
| 2007/0073589 A1 | 3/2007 | Vergeyle et al. |
| 2007/0156436 A1 | 7/2007 | Fisher |
| 2007/0179792 A1 | 8/2007 | Kramer |
| 2007/0278290 A1 | 12/2007 | Messerges |
| 2008/0048022 A1 | 2/2008 | Vawter |
| 2008/0051059 A1 | 2/2008 | Fisher |
| 2008/0154723 A1 | 6/2008 | Ferguson |
| 2008/0208762 A1 | 8/2008 | Arthur |
| 2008/0235103 A1 | 9/2008 | Baccas |
| 2009/0070265 A1 | 3/2009 | Hrabosky |
| 2009/0084840 A1 | 4/2009 | Williams |
| 2009/0104888 A1 | 4/2009 | Cox |
| 2009/0157511 A1 | 6/2009 | Spinnell et al. |
| 2009/0158145 A1 | 6/2009 | Schering |
| 2009/0159663 A1 | 6/2009 | Mullen |
| 2009/0281904 A1 | 11/2009 | Pharris |
| 2009/0313105 A1 | 12/2009 | Magnusson |
| 2010/0030592 A1 | 2/2010 | Evans |
| 2010/0048226 A1 | 2/2010 | Owen |
| 2010/0049599 A1 | 2/2010 | Owen |
| 2010/0049615 A1 | 2/2010 | Rose |
| 2010/0088188 A1 | 4/2010 | Kumar |
| 2010/0138344 A1 | 6/2010 | Wong |
| 2010/0153184 A1 | 6/2010 | Caffrey et al. |
| 2010/0241494 A1 | 9/2010 | Kumar |
| 2010/0274677 A1 | 10/2010 | Florek |
| 2011/0000958 A1 | 1/2011 | Herzig |
| 2011/0047075 A1 | 2/2011 | Fourez |
| 2011/0068173 A1 | 3/2011 | Powers |
| 2011/0079639 A1 | 4/2011 | Khan |
| 2011/0112918 A1 | 5/2011 | Mestr |
| 2011/0176705 A1 | 7/2011 | Kato |
| 2011/0191196 A1 | 8/2011 | Orr |
| 2011/0231238 A1 | 9/2011 | Khan |
| 2011/0264543 A1 | 10/2011 | Taveau |
| 2011/0313804 A1 | 12/2011 | Camp et al. |
| 2011/0313880 A1 | 12/2011 | Paul et al. |
| 2011/0320291 A1 | 12/2011 | Coon |
| 2012/0004972 A1 | 1/2012 | Wengrovitz |
| 2012/0005026 A1 | 1/2012 | Khan |
| 2012/0041823 A1 | 2/2012 | Khan |
| 2012/0066081 A1 | 3/2012 | Shader et al. |
| 2012/0209773 A1 | 8/2012 | Ranganathan |
| 2012/0296741 A1 | 11/2012 | Dykes |
| 2013/0030931 A1 | 1/2013 | Moshfeghi |
| 2013/0275303 A1 | 10/2013 | Fiore et al. |

FOREIGN PATENT DOCUMENTS

| | | |
|---|---|---|
| CN | 102256001 | 11/2011 |
| EP | 1503327 | 12/2005 |
| EP | 2 357 624 A1 | 8/2011 |
| EP | 2372628 | 10/2011 |
| EP | 1 934 964 B1 | 7/2012 |
| GB | 2480282 | 11/2011 |
| KR | 20020004321 | 1/2002 |
| KR | 20090121497 | 11/2009 |
| TW | 200515229 | 6/2005 |
| TW | 200813871 | 3/2008 |
| TW | 416824 | 11/2011 |
| WO | 02/17567 A2 | 2/2002 |
| WO | 2008/104704 | 9/2008 |
| WO | 2009/129749 | 10/2009 |
| WO | 2010062077 | 6/2010 |
| WO | 2011/089423 | 7/2011 |
| WO | 2011083471 | 7/2011 |
| WO | 2011/094424 | 8/2011 |
| WO | 2011/112158 | 9/2011 |
| WO | 2012/158770 | 11/2012 |

OTHER PUBLICATIONS

An Office Action dated Apr. 23, 2012, which issued during the prosecution of U.S. Appl. No. 13/006,137.

An Office Action dated Dec. 19, 2012, which issued during the prosecution of U.S. Appl. No. 12/939,719.

An International Search Report and a Written Opinion both dated May 4, 2012, which issued during the prosecution of Applicant's PCT/US2012/020772.

An International Search Report and a Written Opinion both dated Sep. 4, 2012, which issued during the prosecution of Applicant's PCT/IL2012/000171.

An International Search Report and a Written Opinion both dated Oct. 10, 2012, which issued during the prosecution of Applicant's PCT/US2012/047962.

An International Search Report and a Written Opinion both dated Oct. 2, 2012, which issued during the prosecution of Applicant's PCT/US2012/038098.

An International Search Report and a Written Opinion both dated Jan. 7, 2013, which issued during the prosecution of Applicant's PCT/US2012/059496.

U.S. Appl. No. 61/487,787, filed May 19, 2011.

Googlecheckout. Googlecheckout Mobile Help Center. Mar. 2011 [retrieved on Sep. 6, 2012] Retrieved from: http://web.archive.org/web/2011039102053/https://checkout.google.com/m/helpCenterTerms?type=help.

Huidobro. How to Operate Using NFC to boost mobile payment. Mar. 2011. [Retrieved on Sep. 6, 2012] retrieved from: <URL:http://www.huawei.com/us/static/hw-077142.pdf>.

An Office Action dated Oct. 16, 2013, which issued during the prosecution of U.S. Appl. No. 13/541,089.

An International Search Report dated Aug. 15, 2013, which issued during the prosecution of Applicant's PCT/US2012/057647.

An Office Action dated Jul. 5, 2013, which issued during the prosecution of U.S. Appl. No. 13/249,027.

Trademark Electronic Search System (TESS), American Express, Jun. 25, 2013, United States Patent and Trademark Office.

Trademark Electronic Search System (TESS), C, Jun. 25, 2013,

(56) References Cited

OTHER PUBLICATIONS

United States Patent and Trademark Office.
Trademark Electronic Search System (TESS), Citysearch, Jun. 25, 2013, United States Patent and Trademark Office.
Trademark Electronic Search System (TESS), Falcon View, Jun. 25, 2013, United States Patent and Trademark Office.
Trademark Electronic Search System (TESS), Google, Jun. 25, 2013, United States Patent and Trademark Office.
Trademark Electronic Search System (TESS), Java, Jun. 25, 2013, United States Patent and Trademark Office.
Trademark Electronic Search System (TESS), Linux, Jun. 25, 2013, United States Patent and Trademark Office.
Trademark Electronic Search System (TESS), MacIntosh, Jun. 25, 2013, United States Patent and Trademark Office.
Trademark Electronic Search System (TESS), Mastercard, Jun. 25, 2013, United States Patent and Trademark Office.
Trademark Electronic Search System (TESS), Palm OS, Jun. 25, 2013, United States Patent and Trademark Office.
Trademark Electronic Search System (TESS), Perl, Jun. 25, 2013, United States Patent and Trademark Office.
Trademark Electronic Search System (TESS), Python, Jun. 25, 2013, United States Patent and Trademark Office.
Trademark Electronic Search System (TESS), QR Code, Jun. 25, 2013, United States Patent and Trademark Office.
Trademark Electronic Search System (TESS), Solaris, Jun. 25, 2013, United States Patent and Trademark Office.
Trademark Electronic Search System (TESS), Visa, Jun. 25, 2013, United States Patent and Trademark Office.
Trademark Electronic Search System (TESS), Volkswagen, Jun. 25, 2013, United States Patent and Trademark Office.
Trademark Electronic Search System (TESS), Windows NT, Jun. 25, 2013, United States Patent and Trademark Office.
Trademark Electronic Search System (TESS), Windows Vista, Jun. 25, 2013, United States Patent and Trademark Office.
Trademark Electronic Search System (TESS), Windows XP, Jun. 25, 2013, United States Patent and Trademark Office.
Trademark Electronic Search System (TESS), Yelp, Jun. 25, 2013, United States Patent and Trademark Office.
An Office Action dated Jan. 13, 2014, which issued during the prosecution of Applicant's U.S. Appl. No. 13/249,027.
U.S. Non-Final Office Action dated Jul. 23, 2014, issued in corresponding U.S. Appl. No. 13/541,089.

* cited by examiner

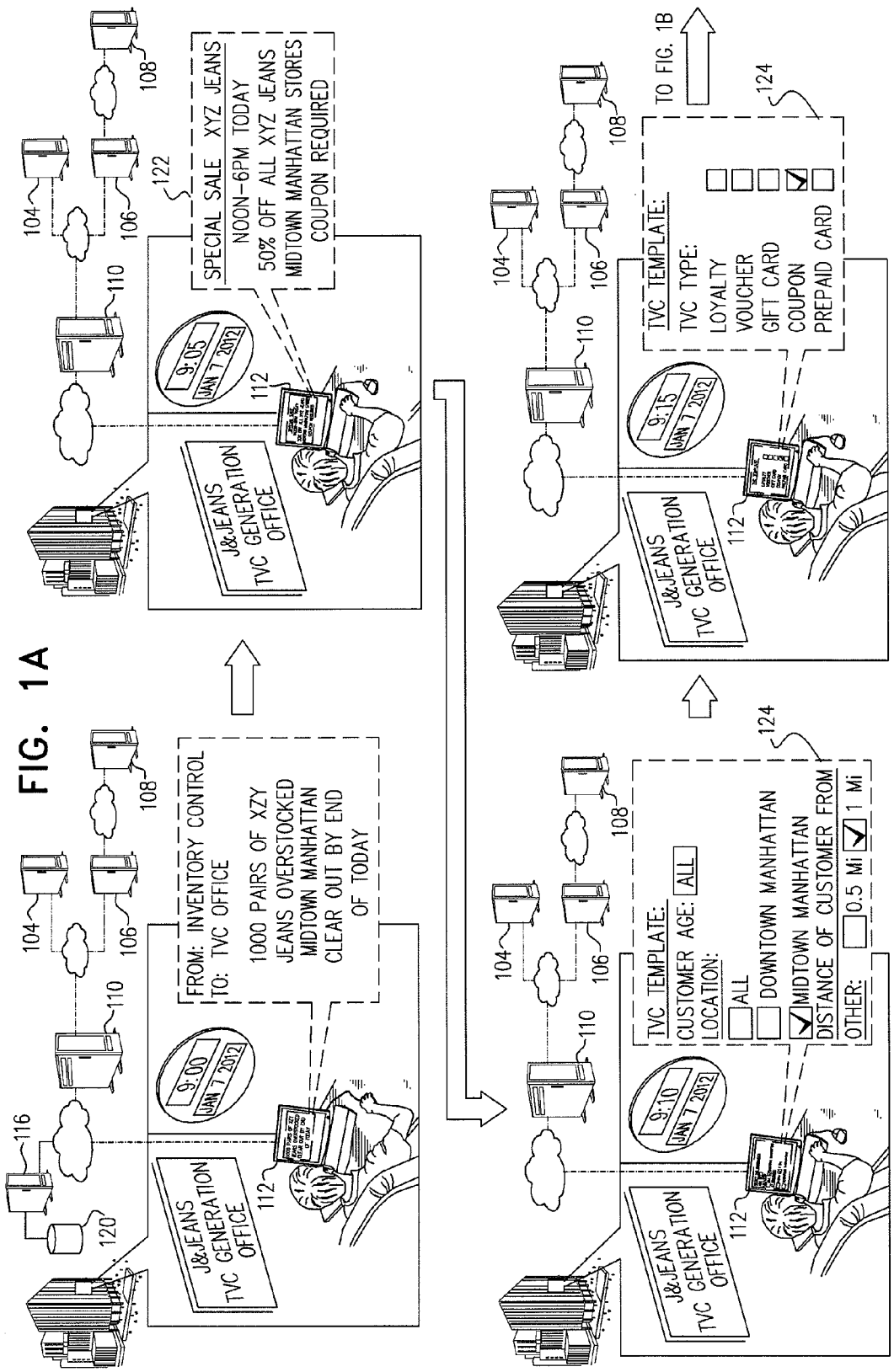

FIG. 1C
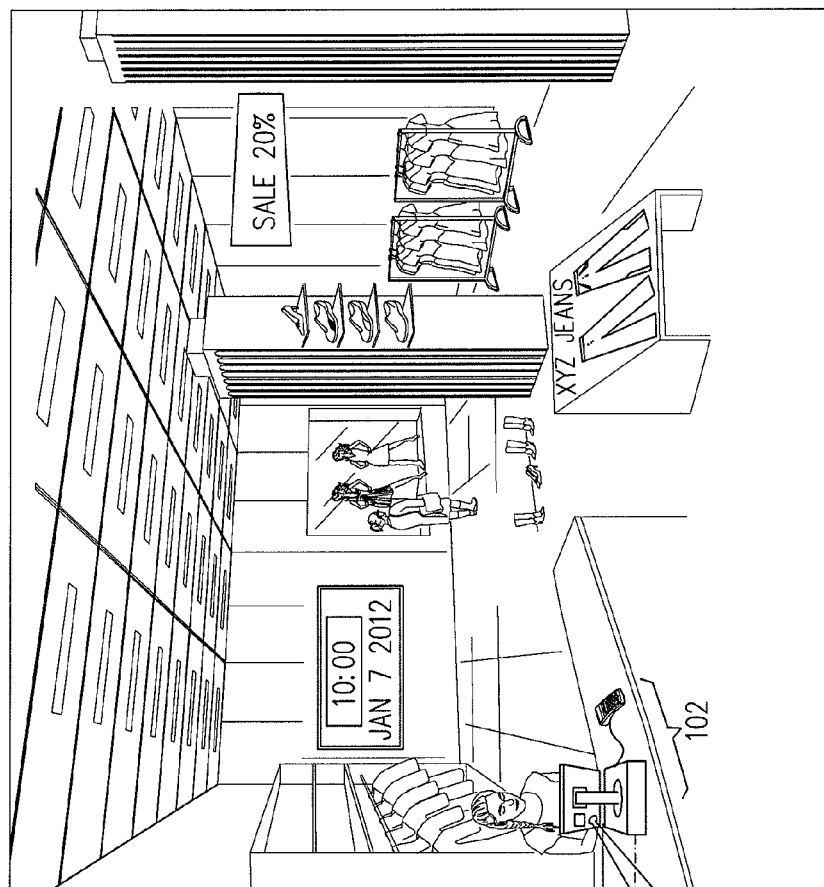
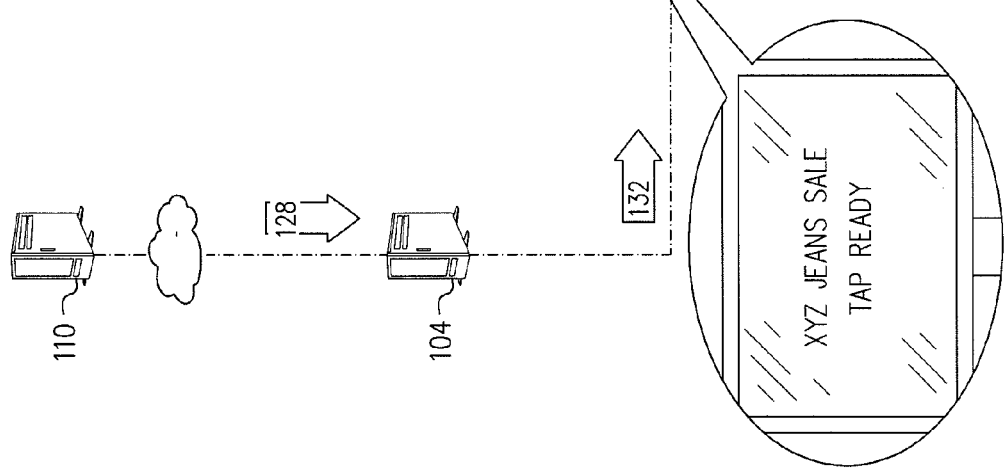

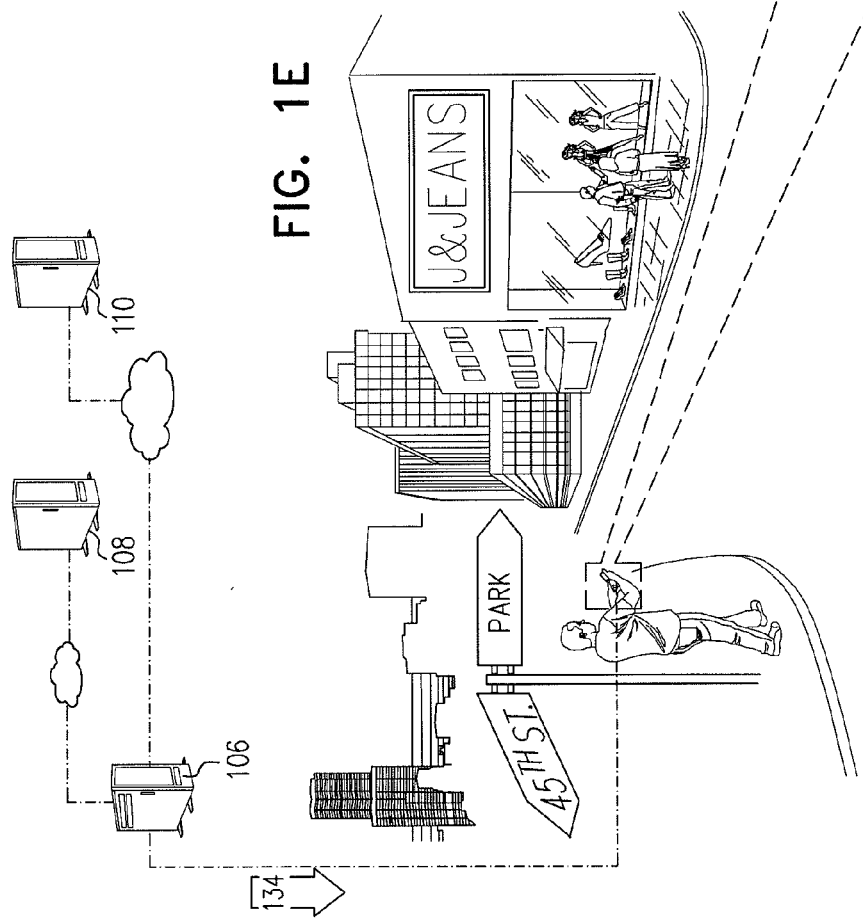
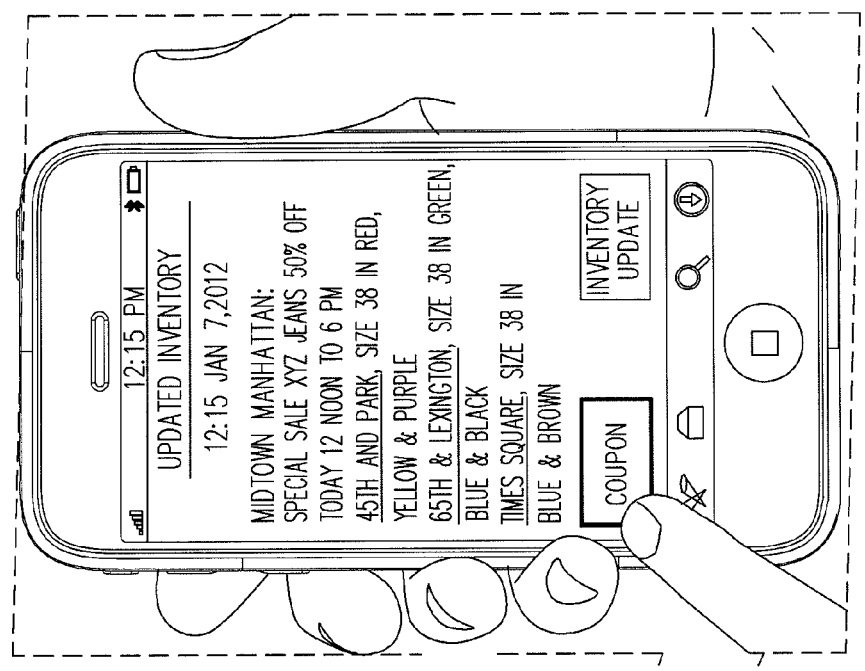
FIG. 1E

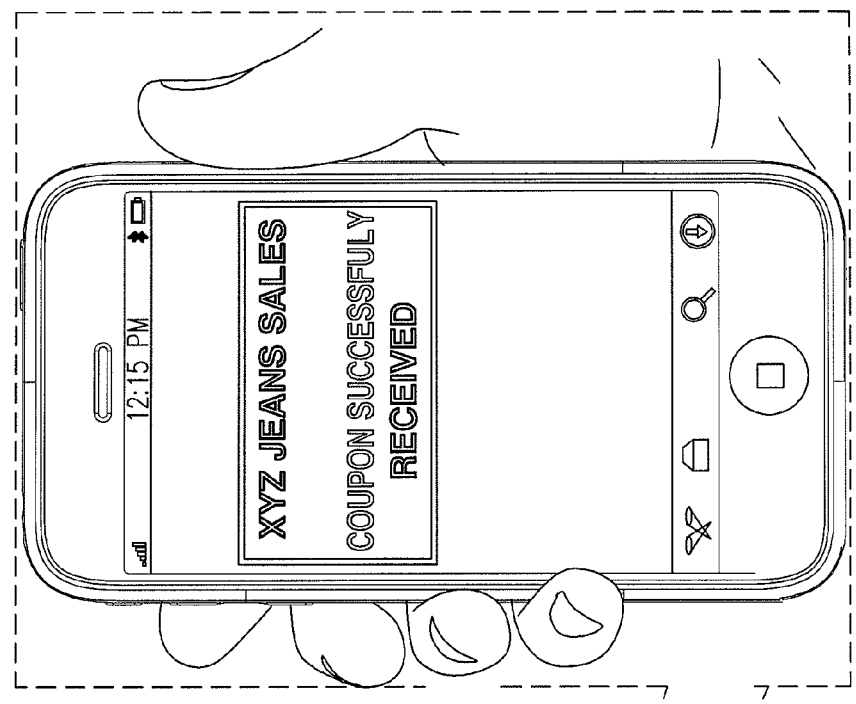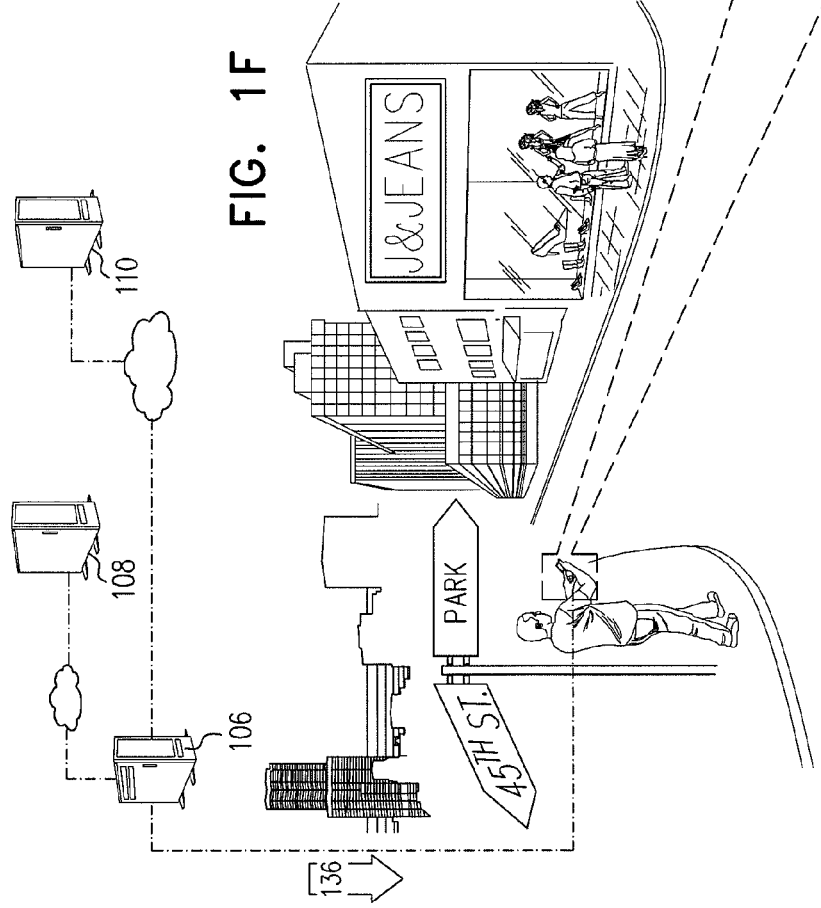
FIG. 1F

FIG. 1H
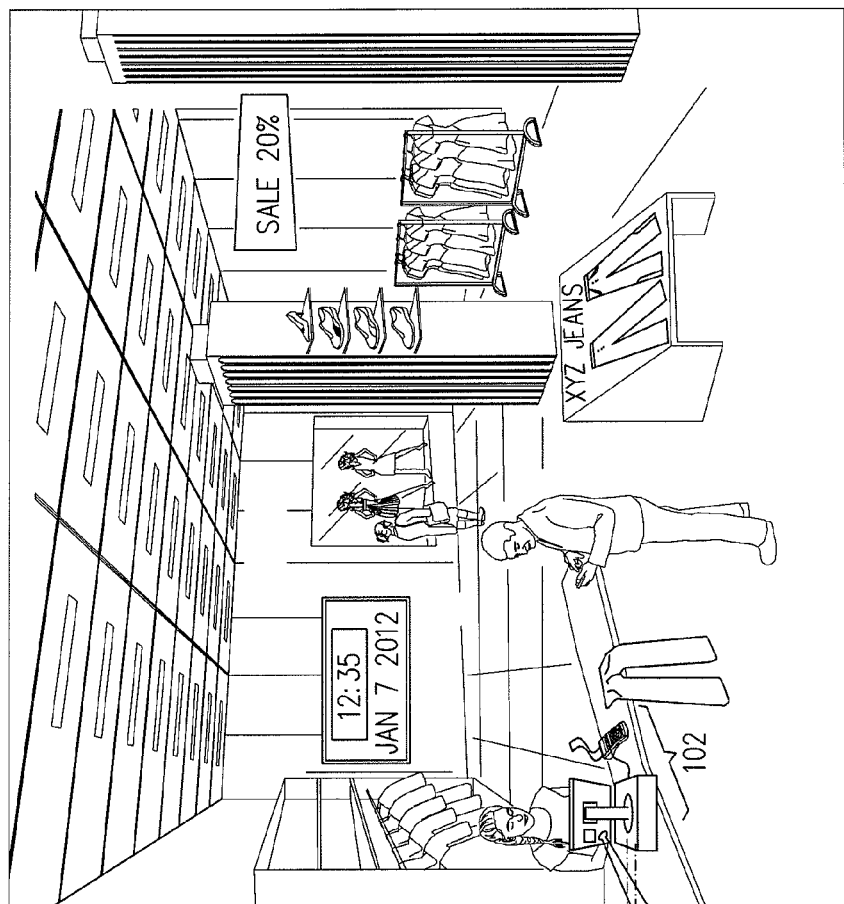
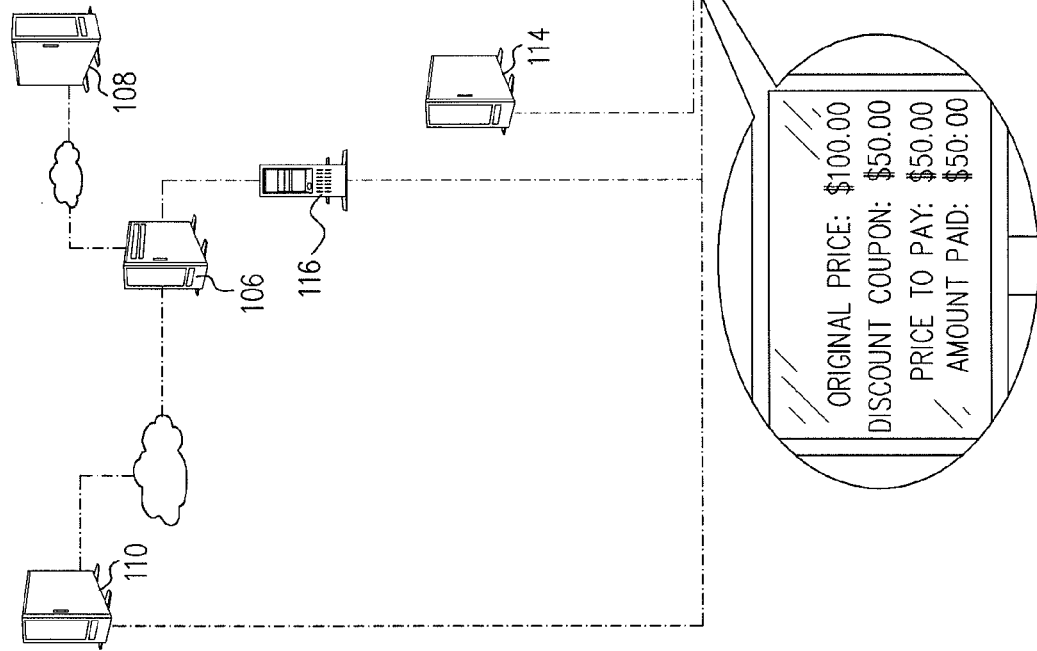

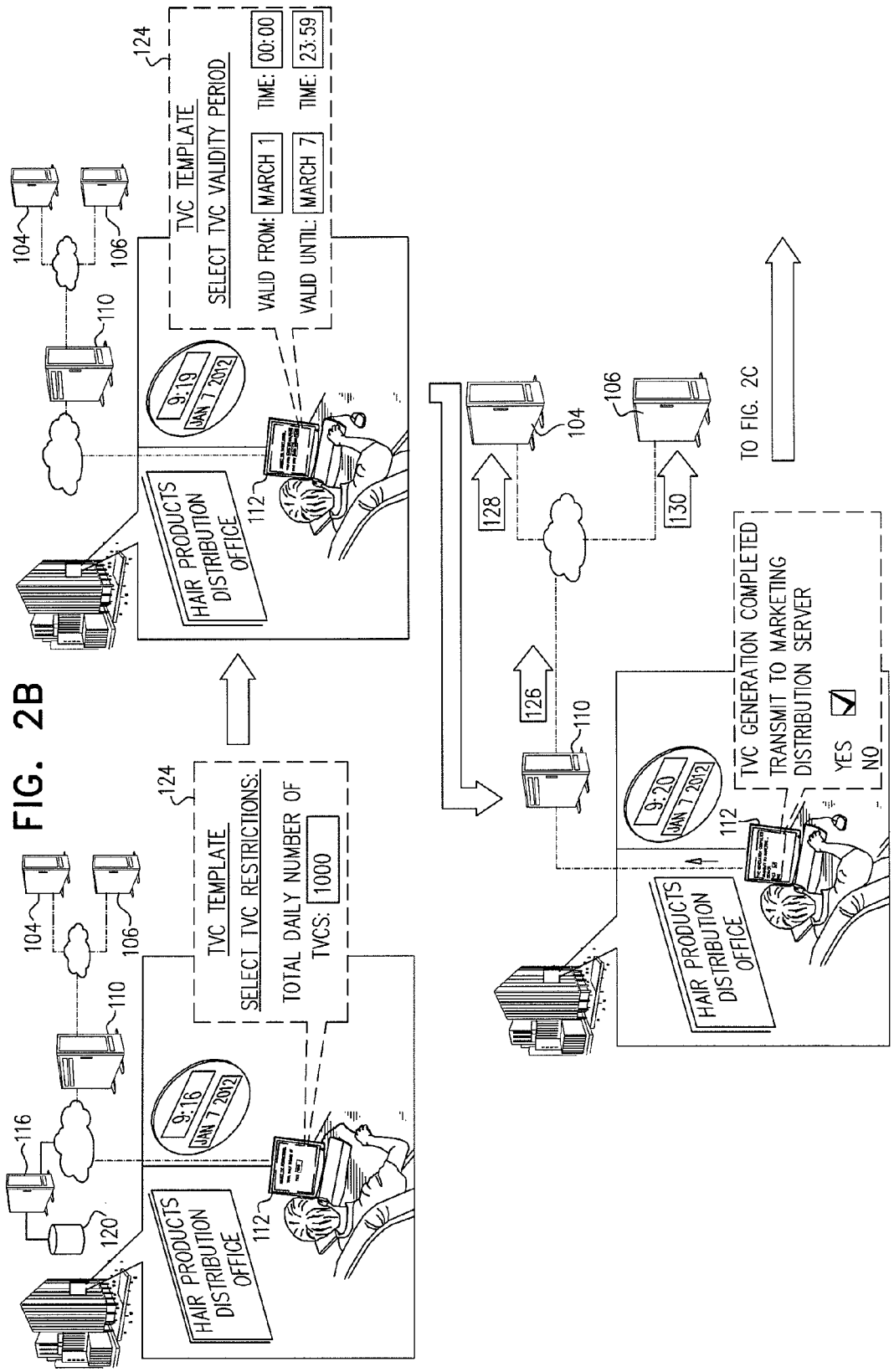

FIG. 2C
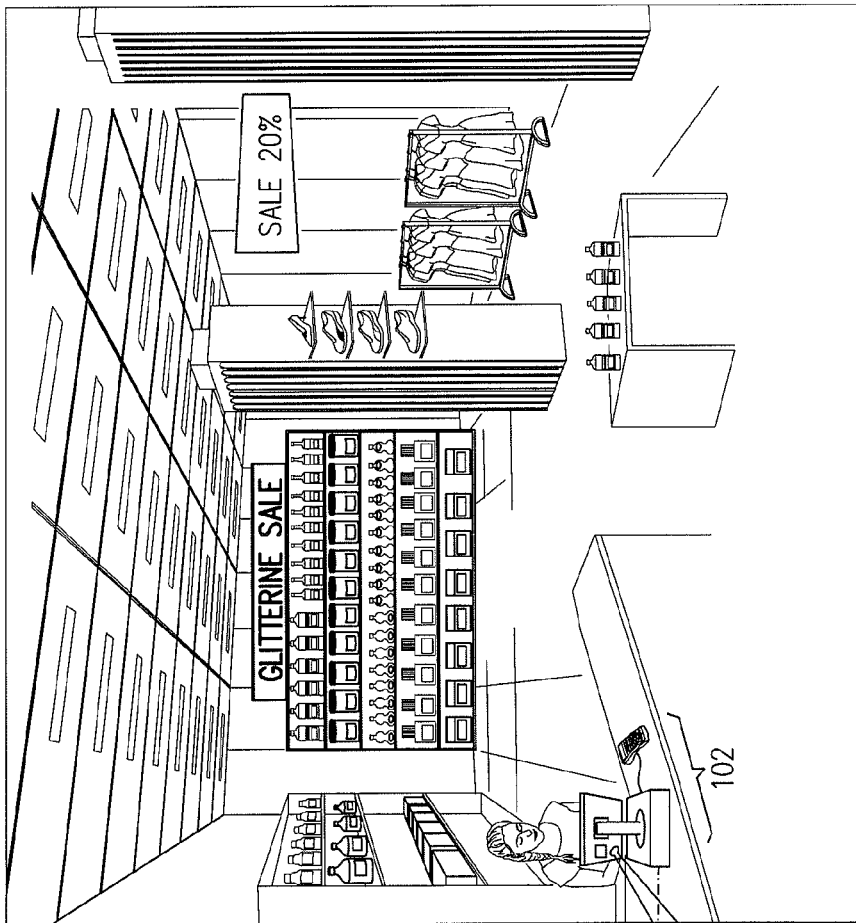
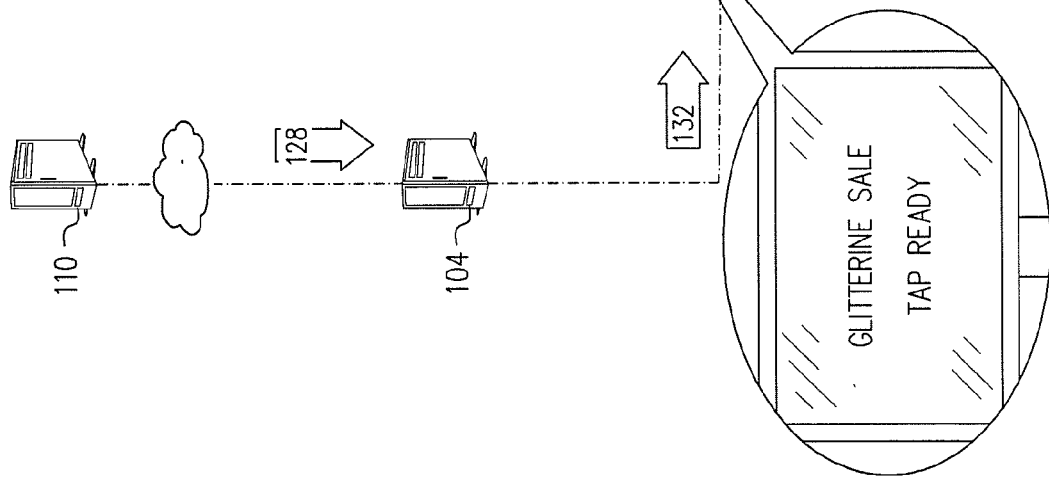

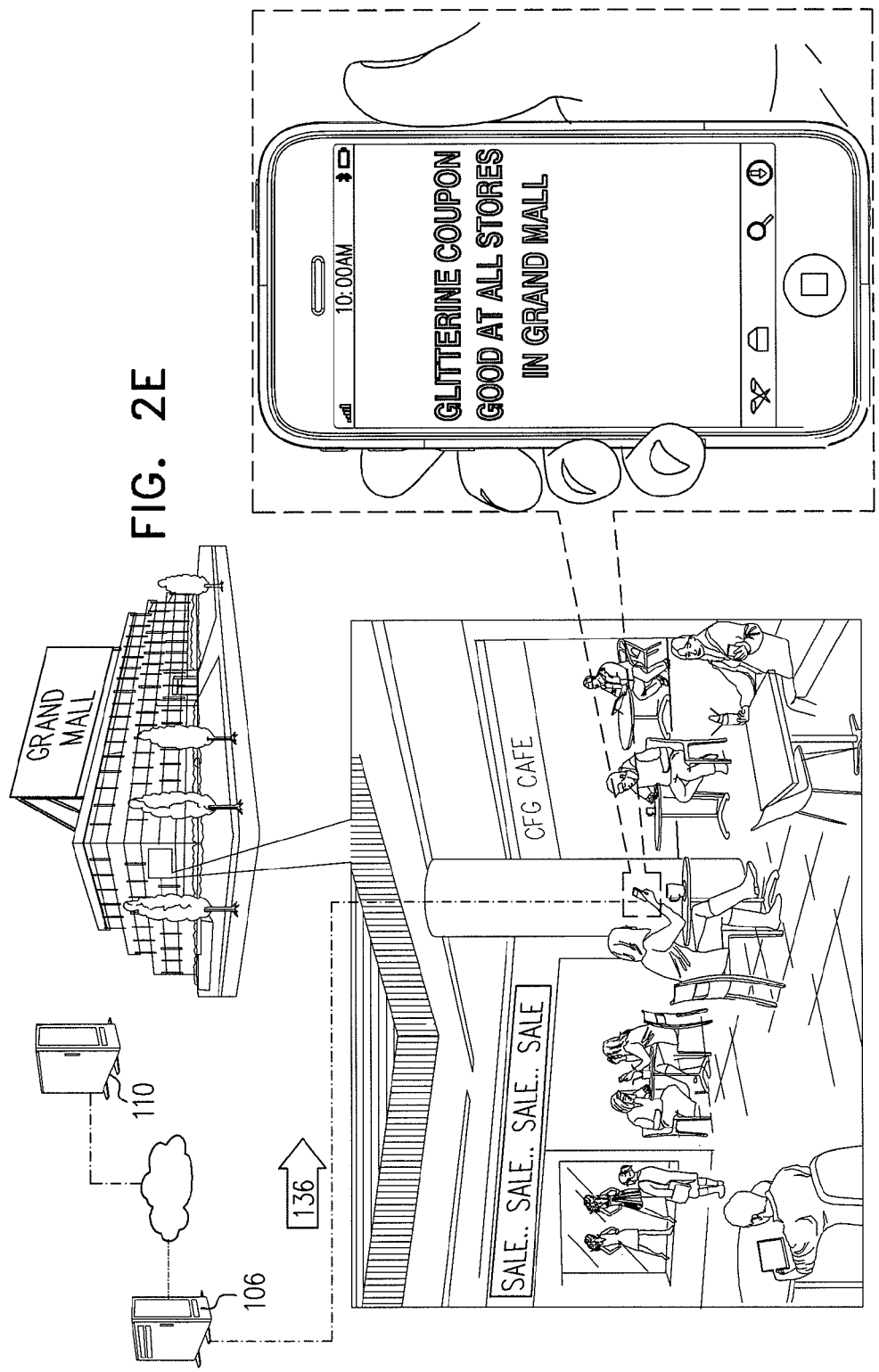

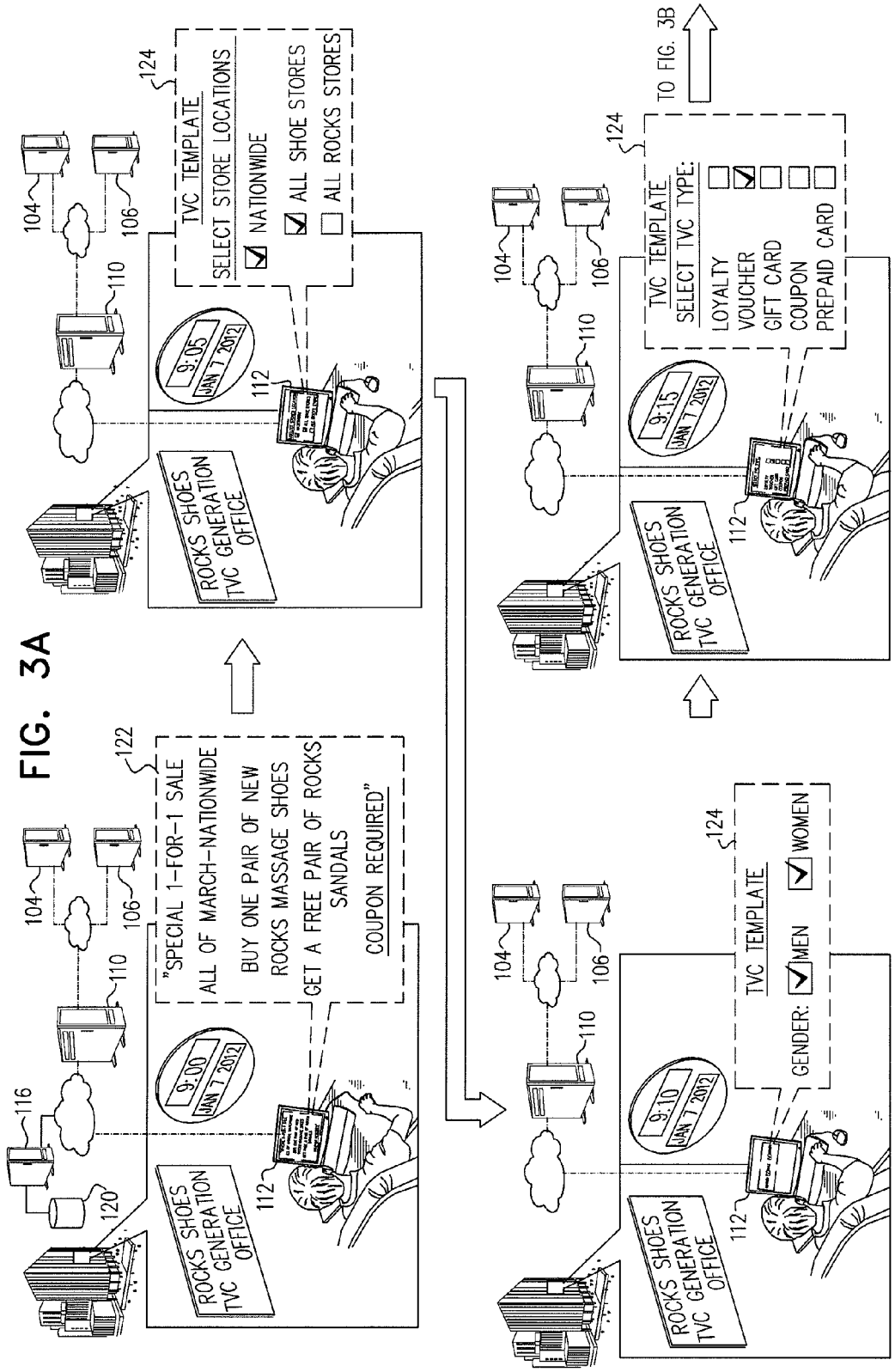

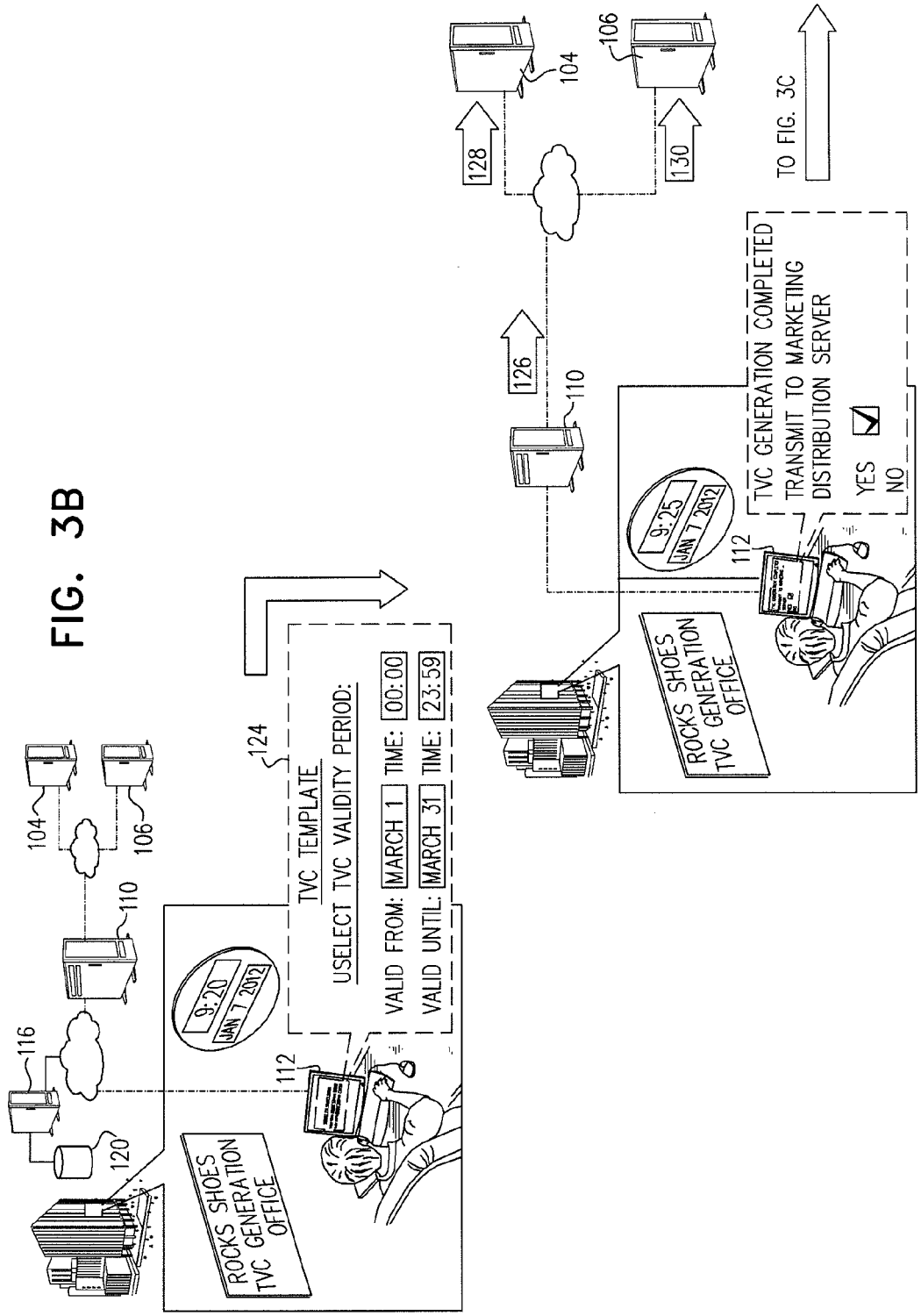

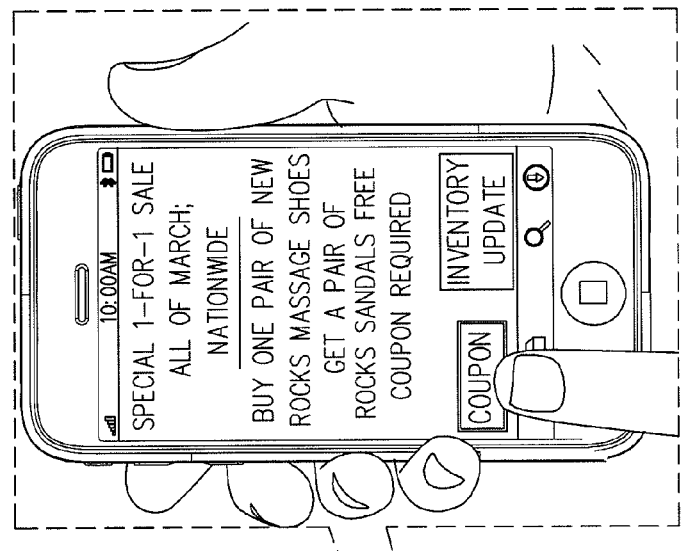
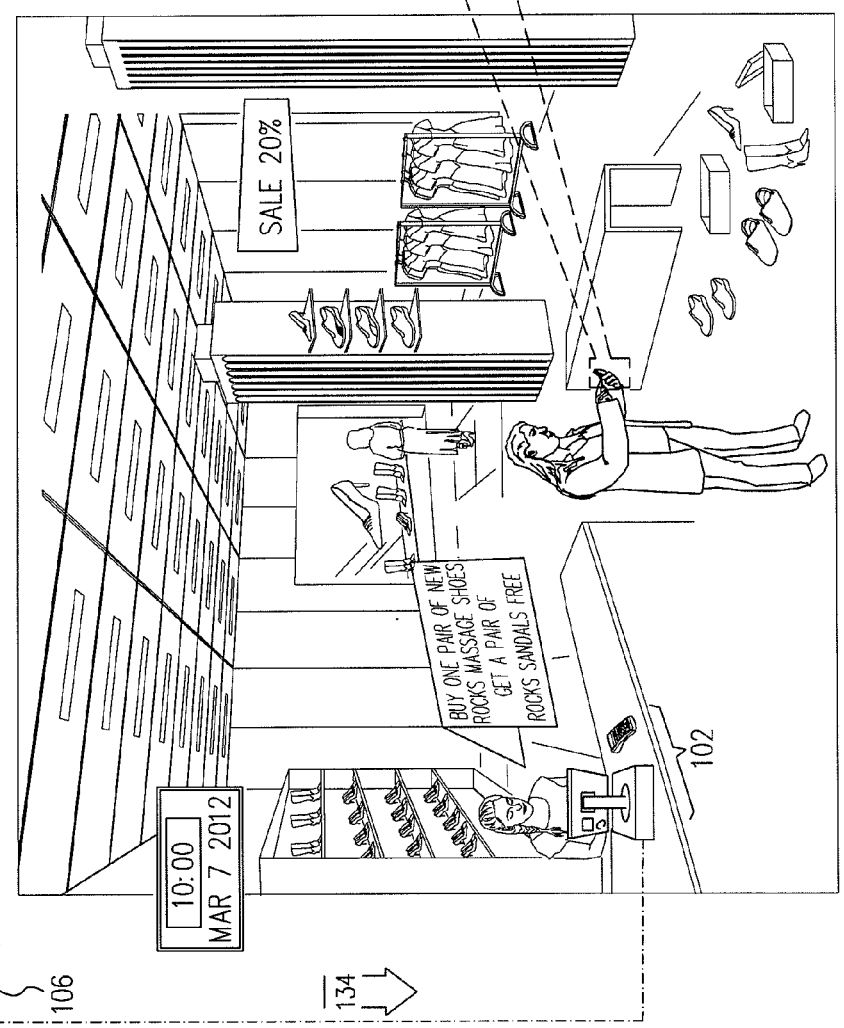
FIG. 3D

MOBILE COMMERCE SYSTEM

REFERENCE TO RELATED APPLICATIONS

Reference is hereby made to U.S. Provisional Patent Application Ser. No. 61/481,842, filed May 3, 2011 and entitled NEAR FIELD COMMUNICATIONS UNIVERSAL ACCEPTANCE PLATFORM, the disclosure of which is incorporated by reference in its entirety and priority of which is hereby claimed pursuant to 37 CFR 1.78(a) (4) and (5)(i).

FIELD OF THE INVENTION

The present invention relates to mobile commerce systems and methods generally.

BACKGROUND OF THE INVENTION

The following patent publications are believed to represent the current state of the art:

U.S. Patent Publication Nos. US2007/156436; US2009/104888; US2009/0313105; US2010/0241494; US2010/049615; US2010/088188; US2010/274677; US2011/191196; US2011/264543; US2011/320291; US2012/004972 and US2012005026;

Published PCT Application Nos. WO2009129749; WO2010062077; WO2011094424; WO2011089423 and WO2011112158; and Patent Publication Nos. GB2480282; EP2372628; CN102256001; CN101567108A; TWM416824Y and KR20090121497A.

SUMMARY OF THE INVENTION

The present invention seeks to provide improved mobile commerce systems and methods.

There is thus provided in accordance with a preferred embodiment of the present invention a mobile commerce system including a multiplicity of Mobile Device-Point of Sale Communication (MPC)-equipped mobile devices, a plurality of MPC-enabled Point-of-Sale (POS) devices, at least one POS configuration server for configuring the plurality of MPC-enabled POS devices, at least one MPC-equipped mobile device configuration server for configuring the plurality of MPC-equipped mobile devices and at least one mobile marketing platform server operative to introduce Transaction Value Certificate (TVC)-related functions and to communicate both with the at least one POS configuration server and the at least one MPC-equipped mobile device configuration server to coordinate operation thereof so that the MPC-enabled POS devices will be "tap-ready" for carrying out the TVC-related functions.

Preferably, the mobile commerce system also includes a performance monitor server operative to receive TVC data from at least one of the plurality of MPC-enabled POS devices and the at least one POS configuration server and to provide an output indicating parameters of use of TVCs. Preferably, at least some of the multiplicity of MPC-equipped mobile devices are MPC wallet-equipped mobile devices.

In accordance with a preferred embodiment of the present invention the TVC-related functions include at least two of receiving TVC data and customer profiles from at least one of an operator interface computer and a merchant ERP system, communicating TVC-related instructions to at least one POS configuration server regarding TVC parameters to be downloaded to the MPC-enabled POS devices, communicating TVC-related instructions to at least one MPC-equipped mobile device configuration server regarding TVC parameters, inventory data and promotion data to be downloaded to selected ones of the multiplicity of MPC wallet-equipped mobile devices; conducting operator initiated TVC database searches, generating TVCs and modifying TVCs.

Preferably, the TVC-related instructions include TVC-specific POS set up instructions which are communicated to the at least one POS configuration server and TVC-specific mobile set up instructions which are communicated to the at least one MPC-equipped mobile device configuration server.

There is also provided in accordance with another preferred embodiment of the present invention a mobile marketing platform server operative to provide selectable TVC-related instructions and configured to communicate the TVC-related instructions to both at least one POS configuration server and at least one MPC-equipped mobile device configuration server, thereby to coordinate operation thereof so that the MPC-enabled POS devices will be "tap-ready" for carrying out the selected TVC-related functions.

Preferably, the TVC-related instructions include instructions to be communicated to at least one POS configuration server regarding TVC parameters to be downloaded to the MPC-enabled POS devices and instructions to be communicated to at least one MPC-equipped mobile device configuration server regarding TVC parameters, inventory data and promotion data to be downloaded to selected ones of the multiplicity of MPC wallet-equipped mobile devices. Additionally, the TVC-related instructions include TVC-specific POS set up instructions to be communicated to the at least one POS configuration server and TVC-specific mobile set up instructions to be communicated to the at least one MPC-equipped mobile device configuration server.

In accordance with a preferred embodiment of the present invention the mobile marketing platform server is configured for communication with a performance monitor server.

There is yet further provided in accordance with still another preferred embodiment of the present invention an MPC-equipped mobile device configuration server configured to receive TVC-related instructions from a mobile marketing platform server and to configure a plurality of MPC-equipped mobile devices to carry out at least some of the TVC-related functions.

Preferably, the TVC-related instructions include instructions indicating TVC parameters, inventory data and promotion data to be downloaded to selected ones of the multiplicity of MPC wallet-equipped mobile devices. Additionally or alternatively, the TVC-related instructions include TVC-specific mobile set up instructions.

There is even further provided in accordance with yet another preferred embodiment of the present invention a POS configuration server configured to receive TVC-related instructions from a mobile marketing platform server and to configure a plurality of MPC-enabled POS devices to carry out at least some of the TVC-related functions.

Preferably, the TVC-related instructions include instructions indicating TVC parameters to be downloaded to MPC-enabled POS devices. Additionally or alternatively, the MPC-equipped POS configuration server is configured for communication with a performance monitor server.

In accordance with a preferred embodiment of the present invention the TVC-related instructions include TVC-specific POS set up instructions.

There is still further provided in accordance with another preferred embodiment of the present invention an MPC-enabled POS device including a payment card acceptor, a TVC instruction receiving port, a TVC data receiving port, a TVC data transmitting port and TVC instruction responsive functionality operative to select at least one TVC data source.

Preferably, the TVC instruction responsive functionality includes TVC data validation functionality.

BRIEF DESCRIPTION OF THE DRAWINGS

The present invention will be understood and appreciated more fully from the following detailed description, taken in conjunction with the drawings in which:

FIGS. 1A, 1B, 1C, 1D, 1E, 1F, 1G and 1H are simplified pictorial illustrations of operation of a mobile commerce system and method in accordance with a preferred embodiment of the present invention;

FIGS. 2A, 2B, 2C, 2D, 2E, 2F and 2G are simplified pictorial illustrations of operation of a mobile commerce system and method in accordance with another preferred embodiment of the present invention;

FIGS. 3A, 3B, 3C, 3D, 3E, 3F and 3G are simplified pictorial illustrations of operation of a mobile commerce system and method in accordance with a preferred embodiment of the present invention;

DETAILED DESCRIPTION OF A PREFERRED EMBODIMENT

Figure 1B:
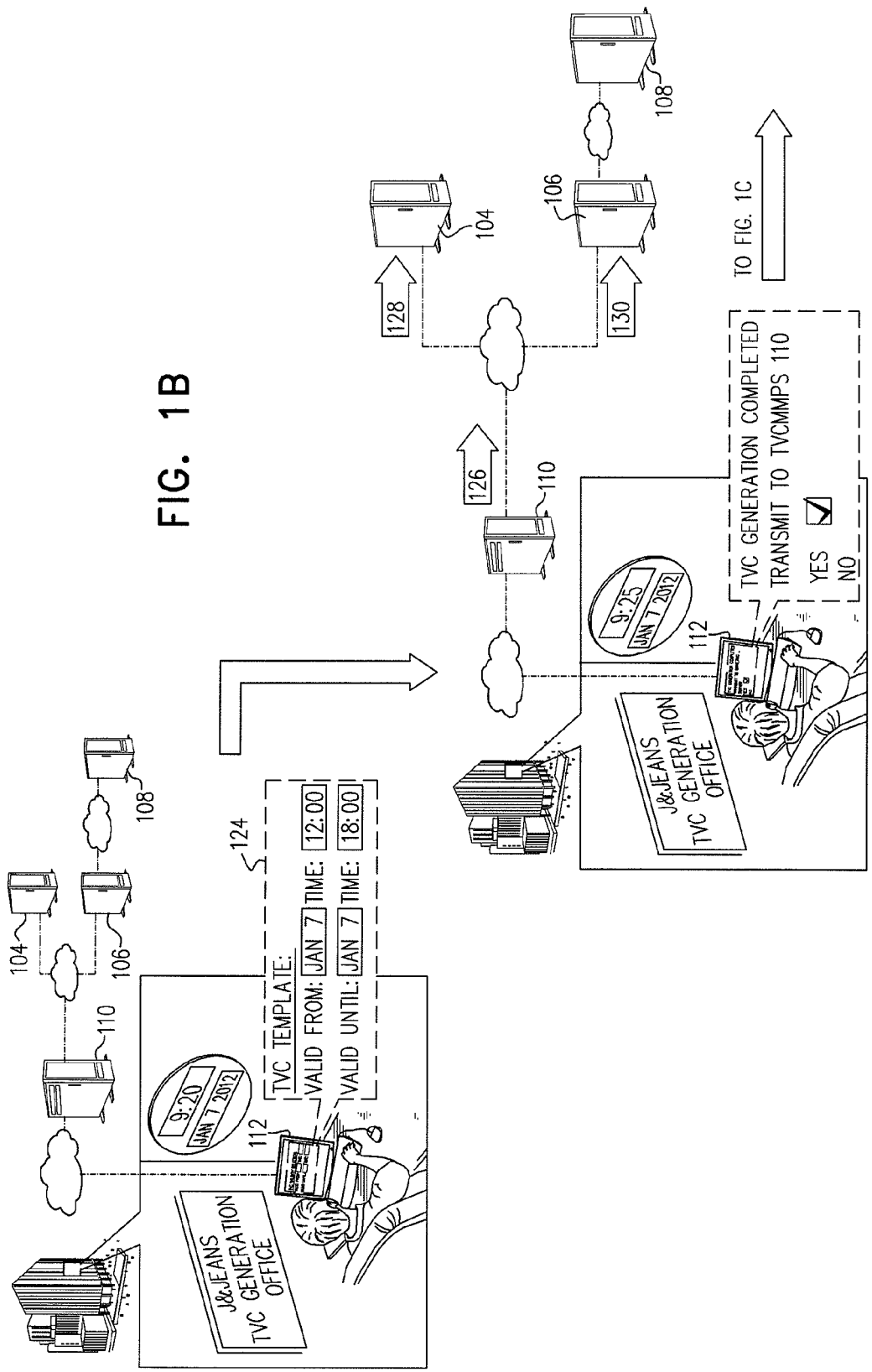

Reference is now made to FIGS. 1A-3G, which are simplified pictorial illustrations of operation of a mobile commerce system and method in accordance with a preferred embodiment of the present invention in three different scenarios. The mobile commerce system and method of embodiments of the present invention provide novel functionalities and system structures associated with the use of Transaction Value Certificates (TVCs) in a mobile commerce environment.

A Transaction Value Certificate is defined as any type of data which, when associated with a transaction, such as a sales transaction, provides value to a party to the transaction. Examples of TVCs include credit TVCs, such as virtual coupons, loyalty cards, vouchers, gift cards, prepaid cards, and debit TVCs, such as bills for payment. Examples of TVC applications include applications for generating tap-ready TVCs, applications for storing unused and used TVCs in a TVC database and applications for transmitting data regarding use of TVCs to a remote monitor.

In accordance with a preferred embodiment of the present invention, the mobile commerce system includes a multiplicity of Mobile Device-Point of Sale Communication (MPC) wallet-equipped mobile devices 100, typically smart phones such as mobile communicators operating on an ANDROID®, iOS®, BLACKBERRY® or WINDOWS MOBILE® operating system, and a plurality of MPC-enabled point of sale (POS) devices 102, such as point of sale devices commercially available from Verifone, Inc., for example, an electronic cash register (ECR), connected to a Near Field Communication (NFC)-enabled payment terminal, such as a VERIFONE® model MX® 915. More generally, the MPC-enabled point of sale devices 102 may include one or more of ECRs, payment terminals, pin pads, and MPC-enabled readers, which may be fully or partially integrated and/or interconnected.

At least one POS configuration server 104, such as a suitably modified NURIT Control Center and Retail 360 server commercially available from Verifone, Inc., is operative for configuring the plurality of MPC-enabled POS devices 102. At least one MPC-equipped mobile device configuration server 106, such as a Trusted Secure Manager (TSM) server, commercially available from Gemalto Nev., is operative for configuring the plurality of MPC wallet-equipped mobile devices 100. Preferably mobile device configuration server 106 receives inputs from a mobile device location server 108, which may be part of a conventional cellular telephone system.

At least one TVC Mobile Marketing Platform Server (TVCMMPS) 110 is operative to introduce selectable marketing functions and to communicate both with the at least one POS configuration server 104 and said at least one MPC-equipped mobile device configuration server 106 to coordinate operation thereof so that the MPC-enabled POS devices 102 will be "tap-ready" for carrying out selected marketing functions. TVCMMPS 110 preferably is operated by at least one operator employing at least one operator interface computer 112.

At least one performance monitor server 114 monitors TVC transactions carried out by the MPC-enabled POS devices 102, reconciles coupon redemptions and provides desired reporting statistics based on data received from MPC-enabled POS devices 102 and optionally from MPC-equipped mobile device configuration server 106.

Referring now to FIGS. 1A-1H, showing a first typical scenario, as shown in FIGS. 1A & 1B, at 9 AM on Jan. 7, 2012, an operator, typically a marketing manager of a chain of retail stores known as J&Jeans, receives a message from an Inventory Control application typically running on a merchant ERP server 116, indicating the presence of excess inventory at a plurality of retail locations. An example of such a message may be the following: "10,000 PAIRS OF XYZ JEANS OVERSTOCKED AT MIDTOWN MANHATTAN STORES—CLEAR OUT BY END OF TODAY". The operator decides to reduce the prices on all 10,000 pairs by 50%. He downloads from an inventory database 120, typically associated with ERP server 116, particulars of the overstocked jeans, typically sizes, colors and quantities of each item at every midtown Manhattan store. This information is preferably automatically supplied to a TVCMMPS 110.

The operator composes a suitable TVC marketing campaign description 122, typically: "SPECIAL SALE NOON—6 PM TODAY 50% OFF ALL XYZ JEANS—MIDTOWN MANHATTAN STORES—COUPON REQUIRED".

The operator, preferably using the operator interface computer 112, fills in a template 124, which preferably allows him to designate particulars of the TVC. These particulars typically include:

a designation of the stores for which the TVC marketing campaign is to be relevant. A typical store designation is "Midtown Manhattan";

TVC Type, such as:
Coupon;
Loyalty Card;
Voucher;
Gift Card;
Prepaid Card;

TVC Validity Conditions:
   Validity duration—start time and date and end time and date;
   Profile of TVC addressees, for example
      Age; and
      Location (distance from closest store).

As seen in FIG. 1B, at least one of the operator interface computer 112, the TVCMMPS 110 and the ERP server 116 preferably automatically carries out the following functions:

1. Ascertains, based on prior definitions, which stores are considered to be Midtown Manhattan stores;
2. Ascertains for each Midtown Manhattan store, particulars of the overstocked jeans, typically sizes, colors and quantities;
3. Prepares TVC data 126, which is preferably output by TVCMMPS 110, including:
   TVC-specific POS set up instructions 128 to the at least one POS configuration server 104 to configure the MPC-enabled POS devices 102 at all of the Midtown Manhattan stores to give effect to the sales price during the period of the sale set forth in the campaign description 122; and
   TVC-specific mobile set up instructions 130 to the MPC-equipped mobile device configuration server 106 to communicate the TVC data to selected ones of the multiplicity of MPC wallet-equipped mobile devices 100.

The TVC-specific mobile set up instructions 130 preferably include:
   a personalized, preferably location-based advertising message announcing the sale, typically:

"SPECIAL SALE XYZ JEANS TODAY 12 NOON TO 6 PM

50% OFF

AT THE STORE CLOSEST TO YOU NOW AT . . . ,

WE HAVE YOUR SIZE __

IN THE FOLLOWING COLORS: . . . , . . . .

AT THE NEXT CLOSEST STORE IN THE DIRECTION

YOU ARE TRAVELLING, AT . . . ,

WE HAVE YOUR SIZE __

IN THE FOLLOWING COLORS: . . . , . . . , . . . .

CLICK FOR COUPON

CLICK HERE FOR REAL TIME INVENTORY UPDATE"; and a coupon generation instruction to the MPC-equipped mobile device configuration server 106 to communicate a coupon issuance instruction to selected ones of the multiplicity of MPC wallet-equipped mobile devices 100.

In accordance with a preferred embodiment of the present invention, the POS configuration server 104 receives instructions 128 from TVCMMPS 110 and transmits relevant TVC POS configuration data 132 to MPC-enabled POS devices 102 to be TVC "tap ready". As seen in FIG. 1C, upon completion of data transfer, preferably a MPC-enabled POS device 102 displays a suitable message, such as:

"XYZ JEANS SALE TAP READY"

thereby notifying the cashier that the new TVC has been set up on MPC-enabled POS device 102 and is tap-ready.

In accordance with a preferred embodiment of the present invention, TVCMMPS 110 preferably receives personal parameter information, such as gender, age, size and shopping preferences, regarding the subscribers of multiplicity of MPC wallet-equipped mobile devices 100 from suitable databases, such as loyalty card databases, social networks and mobile operator databases. Further in accordance with a preferred embodiment of the present invention, MPC-equipped mobile device configuration server 106 preferably receives current location and travel direction information for the subscribers of multiplicity of MPC wallet-equipped mobile devices 100 from suitable databases, such as mobile telephone operator and GPS databases.

In accordance with a preferred embodiment of the present invention, MPC-equipped mobile device configuration server 106 also receives TVC-specific mobile set up instructions 130 sent from TVCMMPS 110 and further communicates a personalized, preferably location-based advertising message 134 announcing the sale to MPC wallet-equipped mobile devices 100. Generation of this message preferably also employs the above-described current information about the availability of the products which are offered in the marketing campaign which is preferably made available by the merchant ERP system 116 and the current location and travel direction information which is preferably made available by the mobile device location server 108.

Figure 1D:
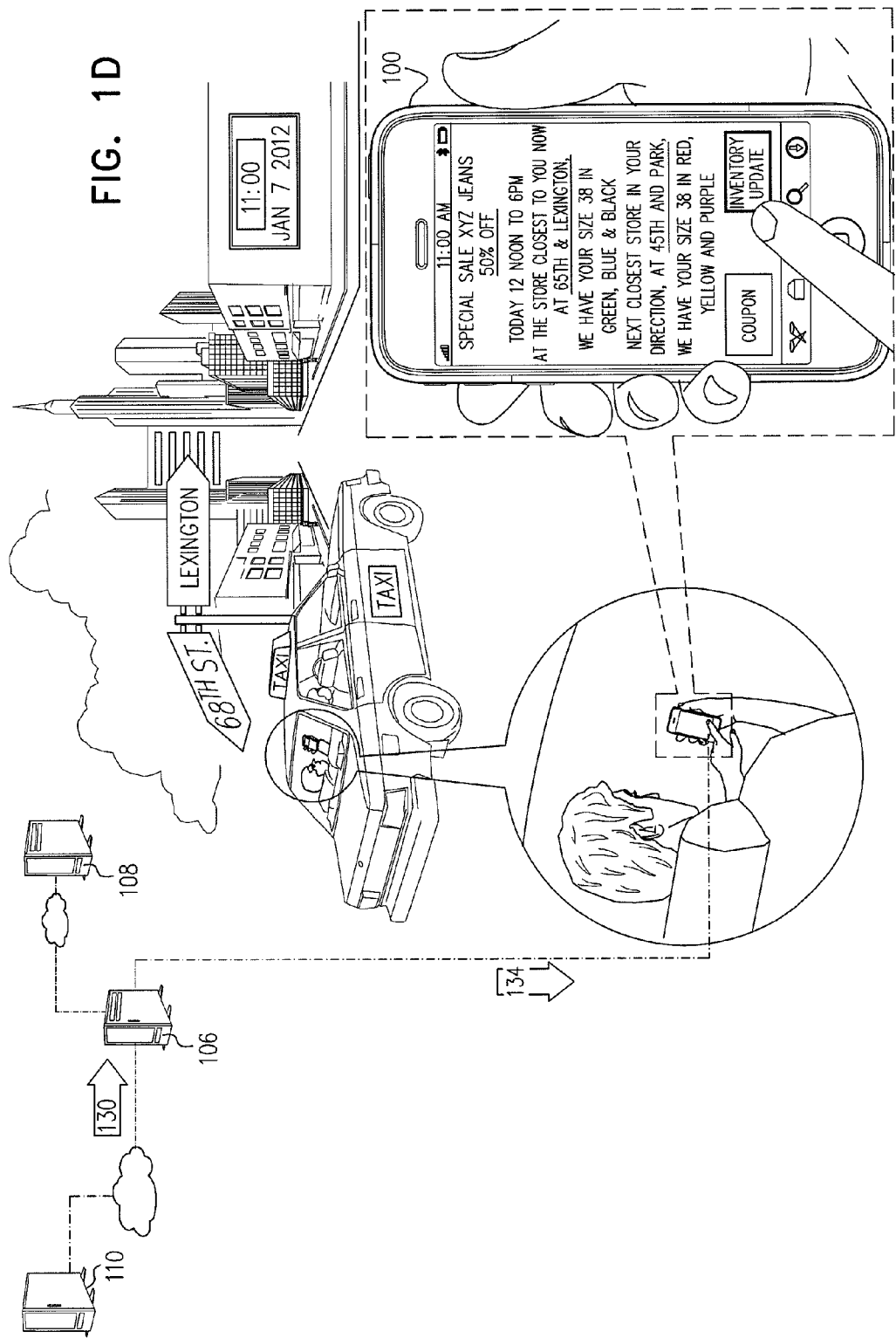

Upon receipt of the personalized, preferably location-based advertising message 134, the MPC wallet-equipped mobile devices 100 may display it on its display, as shown in FIG. 1D:

"SPECIAL SALE XYZ JEANS

50% OFF

TODAY 12 NOON TO 6 PM

AT THE STORE CLOSEST TO YOU NOW

AT 65TH AND LEXINGTON

WE HAVE YOUR SIZE 38 IN

GREEN, BLUE & BLACK

NEXT CLOSEST STORE IN YOUR

DIRECTION AT 45TH AND PARK,

WE HAVE YOUR SIZE 38 IN

RED, YELLOW AND PURPLE".

In accordance with a preferred embodiment of the present invention, for example, if the stock of jeans in the customer's size runs out at a given store while the customer is still in the vicinity of the store, an update message may be sent out or be made available to advise the customer so as to avoid disappointment. Also, as the location of the customer changes, the list of stores in the message changes accordingly, as shown in FIG. 1E. It is appreciated that in this way, a personalized marketing campaign may be set up and managed in near real time.

When a customer wishes to download a TVC coupon to be stored at the MPC wallet-equipped mobile device 100, he may click the "coupon" button as seen in FIG. 1E. In response, a coupon issuance instruction 136 is automatically downloaded from MPC-equipped mobile device configuration server 106 to MPC wallet-equipped mobile device 100 and the MPC wallet-equipped mobile device 100 preferably displays a suitable message, such as:

"XYZ JEANS SALE COUPON SUCCESSFULLY RECEIVED".

Figure 1G:
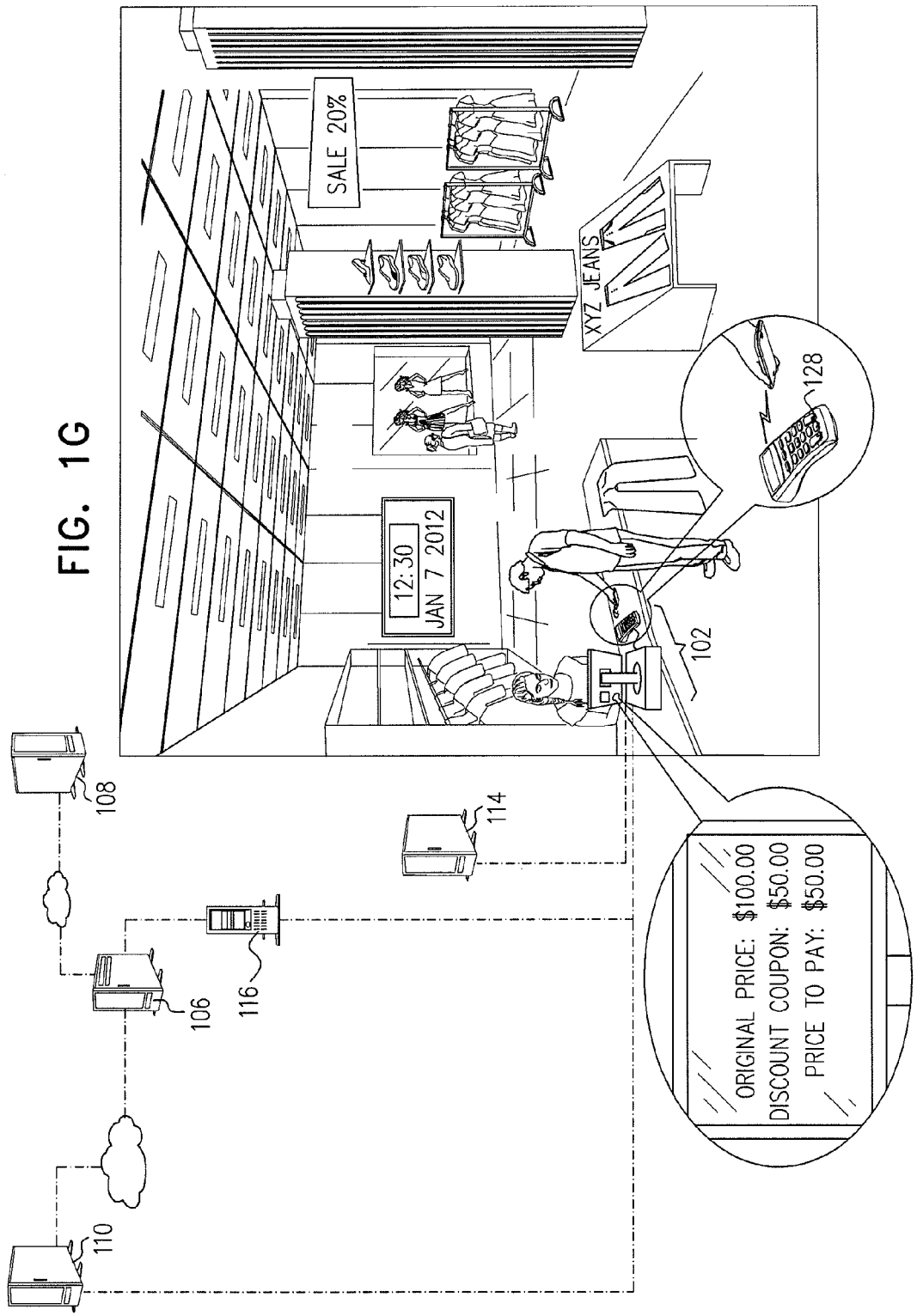

As shown in FIG. 1G, typically when the customer wishes to pay, the customer taps his MPC wallet-equipped mobile device on the MPC-enabled POS device 102, causing TVC coupon data to be communicated to the MPC-enabled POS device from the customer's MPC wallet-equipped mobile device 100. The cashier then enters the non-discounted purchase price and this non-discounted price is displayed, e.g. "XYZ Jeans SIZE 38 TOTAL $100" and the 50% TVC coupon discount is calculated and applied to the transaction and is displayed. The discounted price $50.00, is also displayed to the customer.

The customer is preferably requested once again to tap his MPC wallet-equipped mobile device 100 on the MPC-enabled POS device 102 in order to complete the purchase transaction in a manner typical of conventional payment card purchase transactions, such as via communication with a payment card transaction processor (not shown), customer signature and issuance of a receipt (not shown). Data regarding one or more TVCs actually involved in the transaction are transmitted by the MPC-enabled POS device 102 to a performance monitor server 114 and preferably also to TVCMMPS 110, as described in greater detail hereinbelow. The actual payment made is displayed to the customer as shown in FIG. 1H and preferably printed on a receipt.

It is appreciated that alternatively, the initial tap may take place at any other time during the transaction prior to the second tap. As a further alternative, only a single tap may be carried out in order to both transfer TVC coupon data and to transfer payment card data to cause the MPC-enabled POS device 102 to communicate the amount paid and the payment card data to the transaction processor and thus complete the purchase transaction.

Figure 2A:
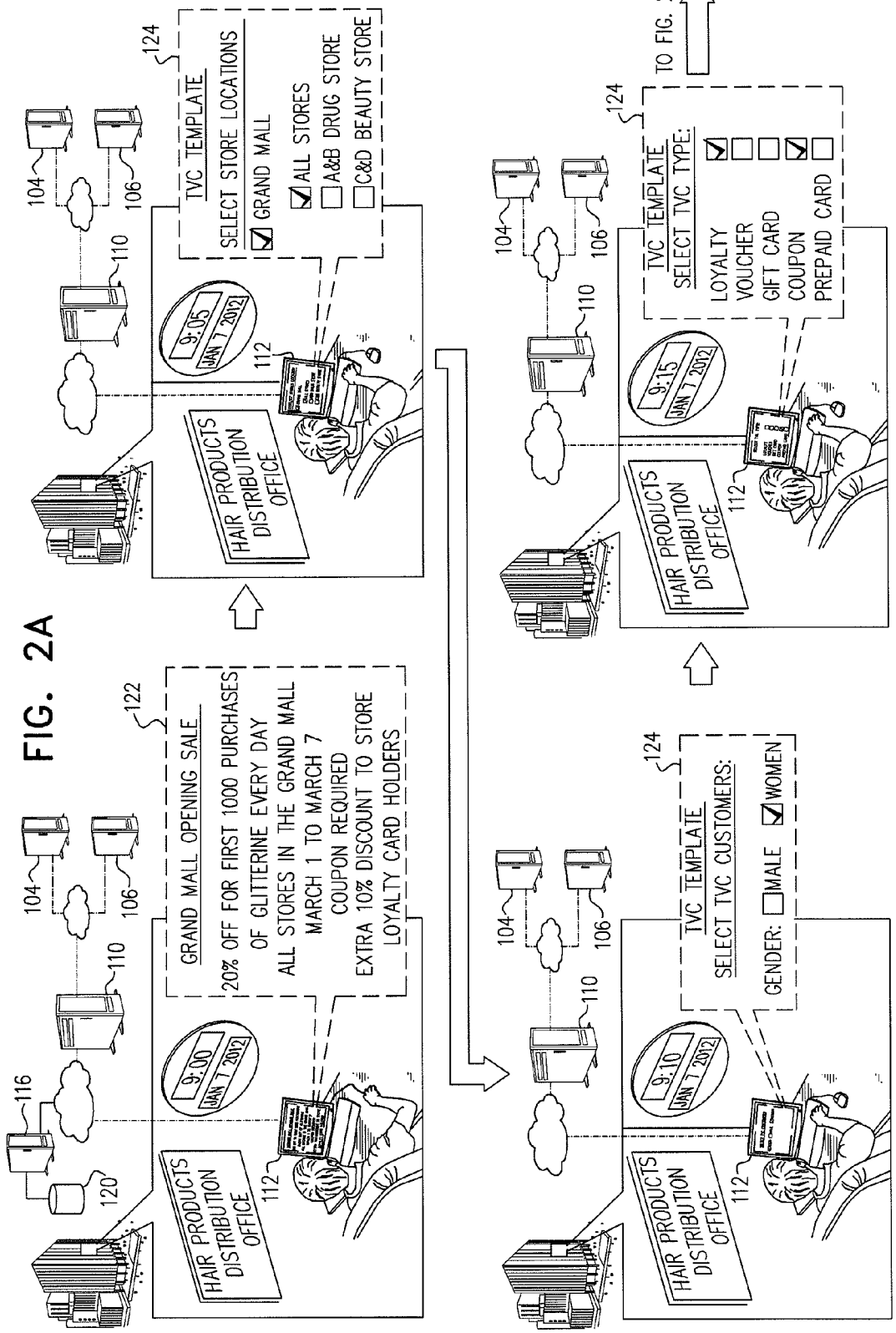

Turning now to FIGS. 2A-2G, which show a second typical scenario, as seen in FIG. 2A-2B, on Jan. 7, 2012, an operator, typically a product manager for a glitter-containing hair rinse, known as GLITTERINE, which is sold in a large variety of different stores, such as department stores, drug stores and beauty supply stores, initiates a marketing campaign for GLITTERINE on the occasion of the opening of a large new mall, known as the GRAND MALL. The product manager, employing an operator interface computer 112, receives an inventory report from an inventory control application typically running on a merchant ERP server 116, indicating the presence of approximately 10,000 units of GLITTERINE at a plurality of retail locations in the GRAND MALL.

It is appreciated that in this scenario, as distinguished from the scenario described hereinabove with reference to FIGS. 1A-1H, at least MPC-enabled POS devices 102, POS configuration servers 104, merchant ERP servers 116 and TVC-MMPS 110 are typically not under common management control and thus the steps which are described hereinbelow must be based on prior operational agreements between the product supplier, who typically controls TVCMMPS 110 and various store operators, who control their respective MPC-enabled POS devices 102, POS configuration server 104 and merchant ERP servers 116.

The manager decides to reduce the standard price of GLITTERINE by 20% for the first 1000 purchases of GLITTERINE every day during a grand opening period of one week starting March 1 and to provide an extra 10% discount to store loyalty card holders. He downloads from an inventory database 120 to operator interface computer 112 particulars of retail locations at the GRAND MALL which stock GLITTERINE and these particulars are supplied to TVCMMPS 110.

The manager composes a suitable marketing campaign description 122 to the TVCMMPS 110 via the operator interface computer 112, typically: "MALL OPENING SALE 20% OFF FOR FIRST 1000 PURCHASES EVERY DAY OF GLITTERINE AT ALL STORES IN THE GRAND MALL FROM MARCH 1 TO MARCH 7—COUPON REQUIRED—EXTRA 10% DISCOUNT TO STORE LOYALTY CARD HOLDERS"

The operator, preferably using the operator interface computer 112, fills in a template 124, which preferably allows him to designate particulars of the TVC. These particulars typically include:

a designation of the stores for which the TVC marketing campaign is to be relevant. A typical store designation is "All stores in Grand Mall";

TVC Type, such as:

Coupon;

Loyalty Card;

Voucher;

Gift Card;

Prepaid Card;

TVC Validity Conditions:

Validity duration—start time and date and end time and date;

Profile of TVC addressees, for example

Age; and

Gender.

As seen in FIG. 2B, at least one of the operator interface computer 112, the TVCMMPS 110 and the ERP servers 116 preferably automatically carries out the following functions:

1. Ascertains, based on prior definitions, which stores in the Grand Mall stock GLITTERINE;

2. Prepares TVC data 126, which is preferably output by TVCMMPS 110, including:

TVC-specific POS set up instructions 128 to the at least one POS configuration server 104 to configure the MPC-enabled POS devices 102 at all of the stores in the Grand Mall which stock GLITTERINE to give effect to the sales price during the period of the sale set forth in the campaign description 122; and TVC-specific mobile set up instructions 130 to the MPC-equipped mobile device configuration server 106 to communicate the TVC data to selected ones of the multiplicity of MPC wallet-equipped mobile devices 100.

The TVC-specific mobile set up instructions 130 preferably include:

an advertising message, announcing the sale, typically:

"GRAND MALL OPENING SALE

20% OFF FOR THE FIRST 1000 PURCHASES

OF GLITTERINE EVERY DAY

AT ALL STORES IN THE GRAND MALL

MARCH 1 TO MARCH 7

COUPON REQUIRED

EXTRA 10% DISCOUNT TO STORE LOYALTY CARD HOLDERS" and a coupon generation instruction to the MPC-equipped mobile device configuration server 106 to communicate a coupon issuance instruction to selected ones of the multiplicity of MPC wallet-equipped mobile devices 100.

In accordance with a preferred embodiment of the present invention, the POS configuration server 104 receives instructions 128 from TVCMMPS 110 and transmits relevant TVC POS configuration data 132 to MPC-enabled POS devices 102 to be TVC "tap ready". As seen in FIG. 2C, upon completion of data transfer, preferably a MPC-enabled POS device 102 displays a suitable message, such as:

"GLITTERINE SALE TAP READY"

thereby notifying the cashier that the new TVC has been set up on MPC-enabled POS device 102 and is tap-ready.

In accordance with a preferred embodiment of the present invention, TVCMMPS 110 preferably receives personal parameter information, such as gender and age, regarding the subscribers of multiplicity of MPC wallet-equipped mobile devices 100 from suitable databases, such as loyalty card databases, social networks and mobile operator databases.

In accordance with a preferred embodiment of the present invention, MPC-equipped mobile device configuration server 106 also receives TVC-specific mobile set up instructions 130 sent from TVCMMPS 110 and further communicates an advertising message 134 announcing the sale to MPC wallet-equipped mobile devices 100. Generation of this message preferably also employs the above-described current information about the availability of the products which are offered in the marketing campaign, which is preferably made available by the merchant ERP system 116 and the current status of the number of purchases vis-à-vis the daily purchase limits specified in the campaign, which is preferably made available by the performance monitor server 114.

Figure 2D:
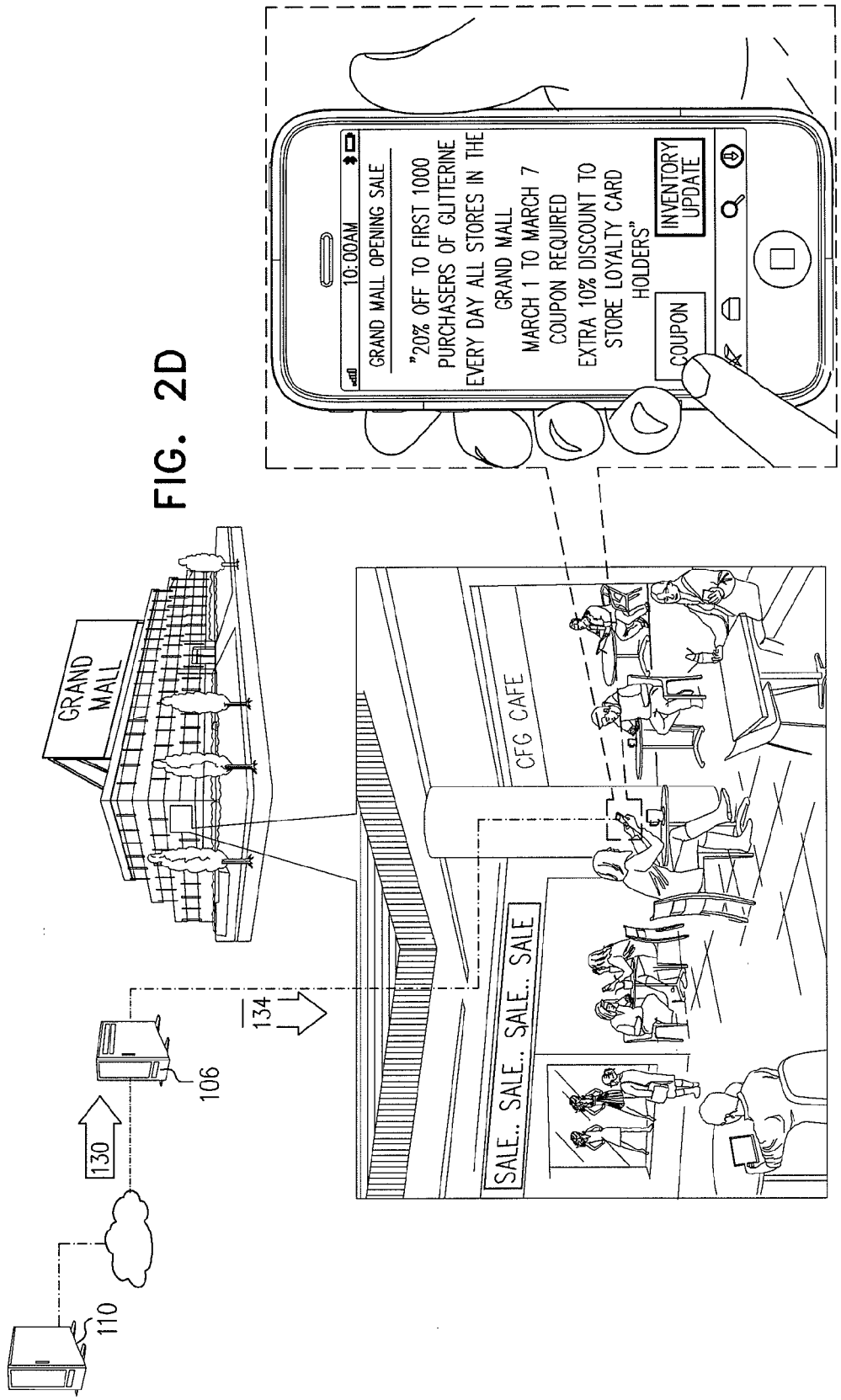

Upon receipt of the advertising message 134, the MPC wallet-equipped mobile device 100 may display it on its display, as shown in FIG. 2D:

"GRAND MALL OPENING SALE

20% OFF TO FIRST 1000

PURCHASES OF GLITTERINE

EVERY DAY AT ALL STORES IN THE

GRAND MALL

MARCH 1 TO MARCH 7

COUPON REQUIRED

EXTRA 10% DISCOUNT TO

STORE LOYALTY CARD HOLDERS"

In accordance with a preferred embodiment of the present invention, for example, if the daily purchase limit is exceeded, an update message may be sent out or be made available to advise the customer so as to avoid disappointment. It is appreciated that in this way, a marketing campaign may be managed in near real time.

When a customer wishes to download a TVC coupon to be stored at the MPC wallet-equipped mobile device 100, he may click the "coupon" button as seen in FIG. 2E. In response, a coupon issuance instruction 136 is automatically downloaded from MPC-equipped mobile device configuration server 106 to MPC wallet-equipped mobile device 100 and the MPC wallet-equipped mobile device 100 preferably displays a suitable message, such as:

"GLITTERINE COUPON RECEIVED

GOOD AT ALL STORES IN GRAND MALL".

Figure 2F:
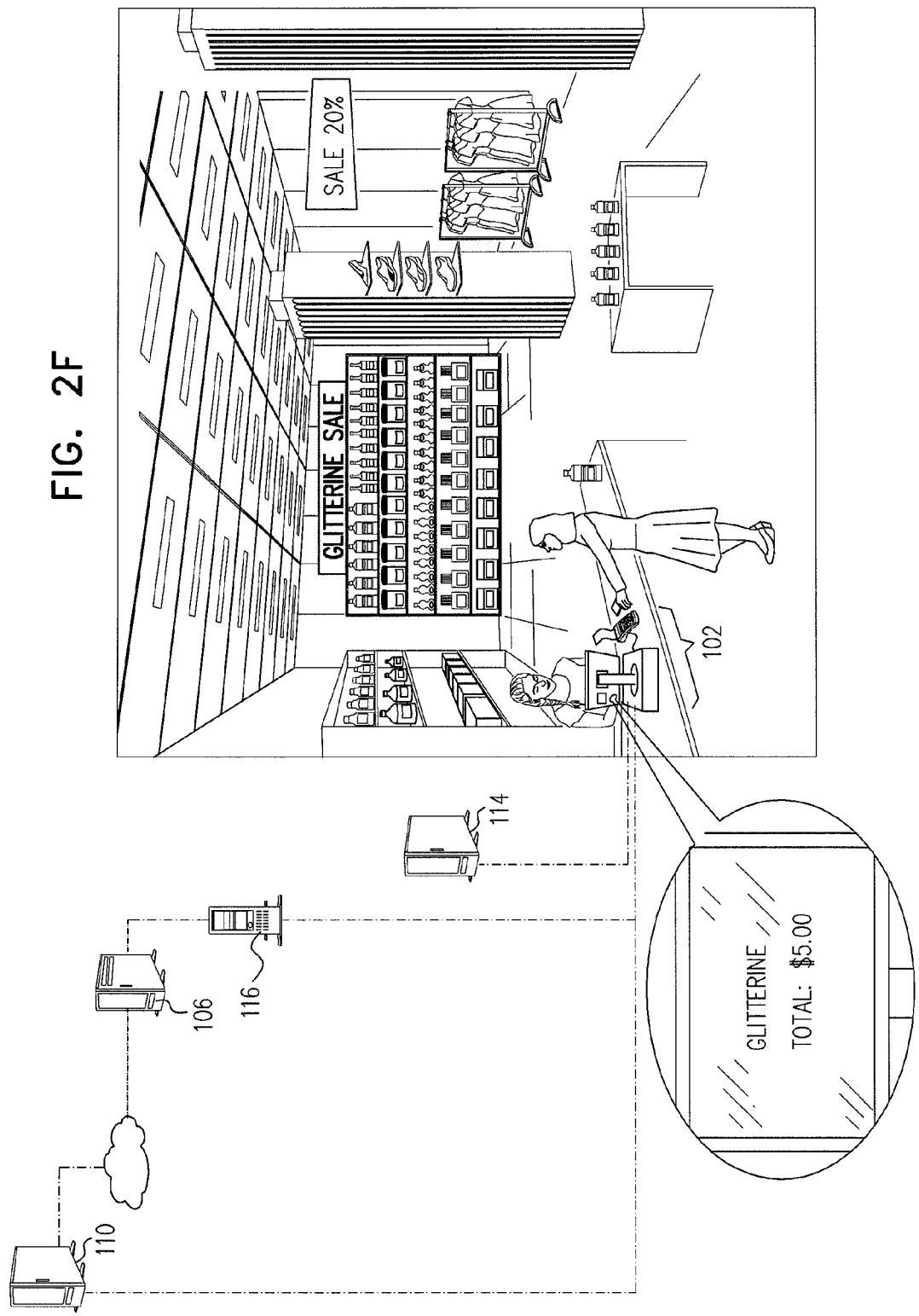
Figure 2G:
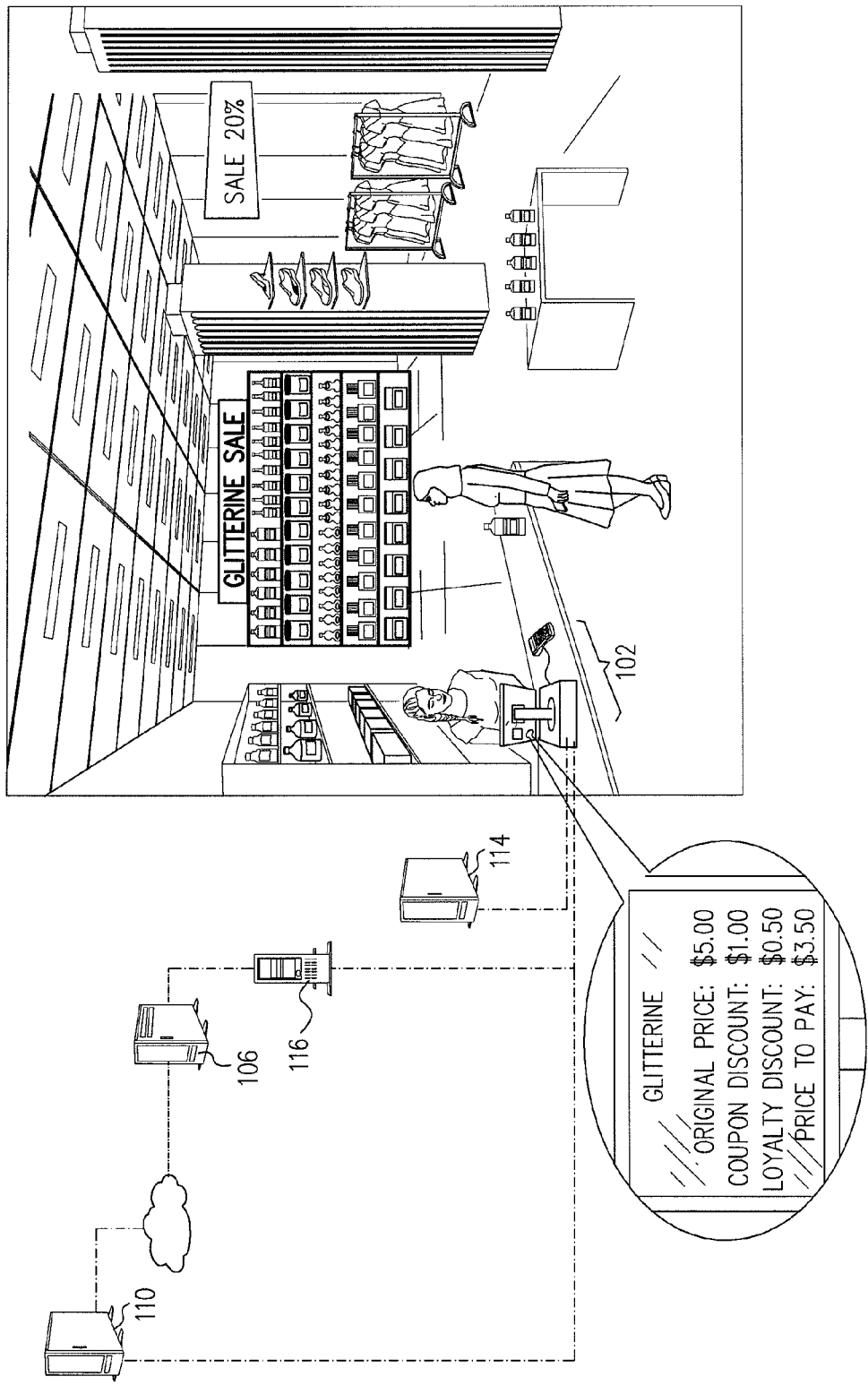

As shown in FIG. 2F, typically when the customer wishes to pay, the cashier enters the non-discounted purchase price and this non-discounted price is displayed, e.g. "GLITTERINE $5.00". The customer then taps his MPC wallet-equipped mobile device on the MPC-enabled POS device 102, and a total 30% discount including the 10% loyalty card discount is calculated and applied to the transaction, provided that the daily purchase limit has not been exceeded. If so, the discounted price $3.50, is displayed to the customer, as shown in FIG. 2G. It is appreciated that communication between the MPC-enabled POS devices 102 and the performance monitor server 114 is preferably employed for TVC daily purchase limit validity management.

The customer is preferably requested once again to tap his MPC wallet-equipped mobile device 100 on the MPC-enabled POS device 102 in order to complete the purchase transaction in a manner typical of conventional payment card purchase transactions, such as via communication with a payment card transaction processor (not shown), customer signature and issuance of a receipt (not shown). Data regarding one or more TVCs actually involved in the transaction are transmitted by the MPC-enabled POS device 102 to a performance monitor server 114 and preferably also to TVCMMPS 110, as described in greater detail hereinbelow.

It is appreciated that alternatively, the initial tap may take place prior to entry by the cashier of the non-discounted purchase price. As a further alternative, only a single tap may be carried out in order to both transfer TVC coupon data and to transfer payment card data to cause the MPC-enabled POS device 102 to communicate the amount paid and the payment card data to the transaction processor and thus complete the purchase transaction.

Figure 3C:
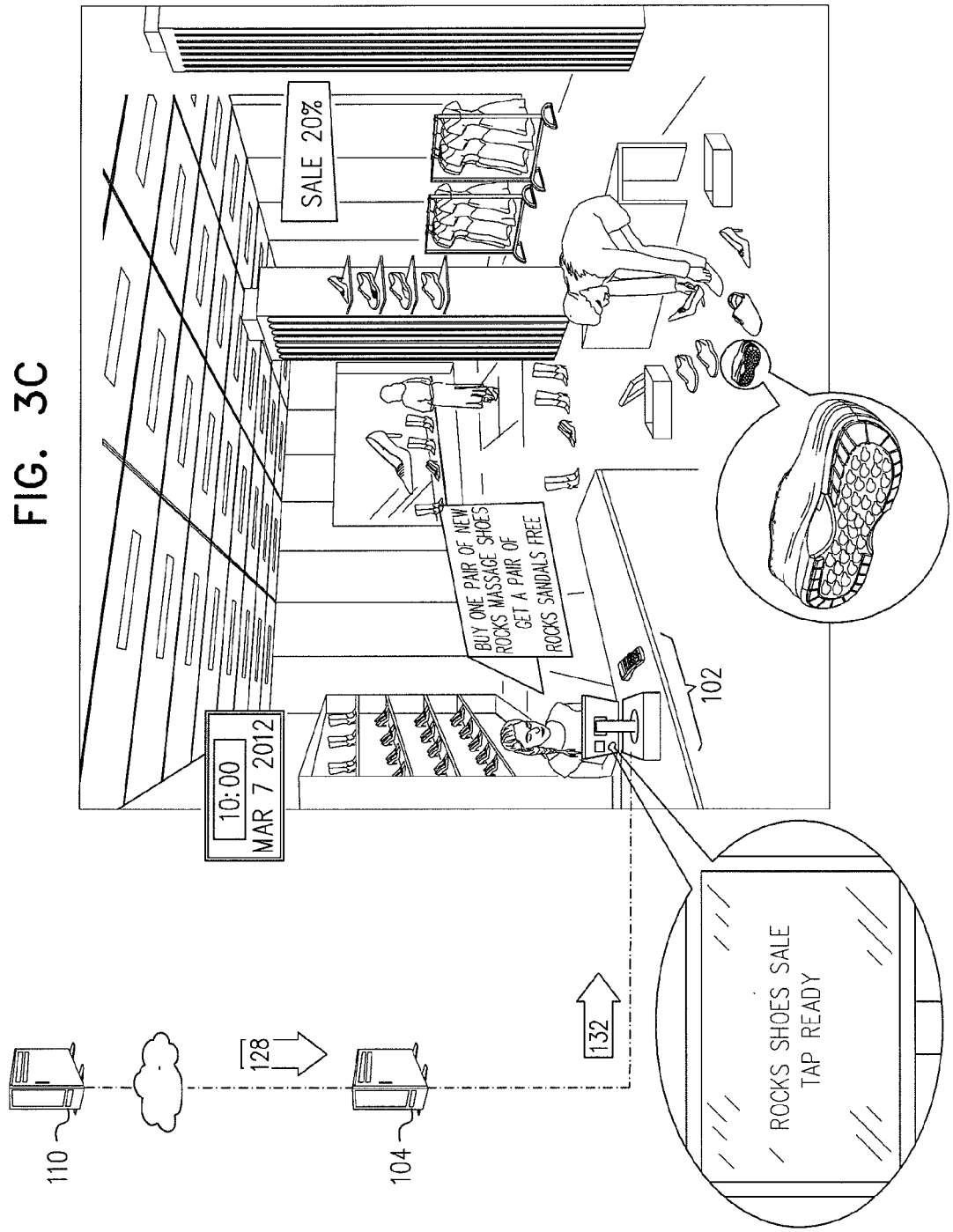

Turning now to FIGS. 3A-3G, which show a third typical scenario, as seen in FIGS. 3A-3B, on Jan. 7, 2012, an operator, such as a new product introduction marketing director, receives a message from a new product manager of a consumer product manufacturer, such as ROCKS shoes, requesting that he initiate a national new product introduction for all locations and for all retail outlets. The new product is known as ROCKS MASSAGE and is a shoe whose sole has pebble-shaped protrusions which vibrate when the shoe is worn and provide a massage function. The logistics department of ROCKS shoes arranges for the product to reach all retail stores by Mar. 1, 2012. The operator also receives an input from an inventory controller 116 that there is currently an overstock of ROCKS sandals nationwide.

It is appreciated that in this scenario, as distinguished from the scenario described hereinabove with reference to FIGS. 1A-1H, at least MPC-enabled POS devices 102, POS configuration servers 104, merchant ERP servers 116 and TVC-MMPS 110 are typically not under common management control and thus the steps which are described hereinbelow must be based on prior operational agreements between the product supplier, who typically controls TVCMMPS 110 and various store operators, who control their respective MPC-enabled POS devices 102, POS configuration servers 104 and merchant ERP servers 116. Also in this scenario, as distinguished from the scenario described hereinabove with reference to FIGS. 2A-2G, at least MPC-enabled POS device 102 includes an ECR, which is not connected to a payment terminal.

The new product introduction marketing director decides to make a 1 for 1 offer whereby a purchaser of ROCKS MASSAGE shoes will receive a pair of ROCKS sandals free.

The manager composes a suitable marketing campaign description 122 to the TVCMMPS 110 via the operator interface computer 112, typically: "SPECIAL 1-FOR-1 SALE ALL OF MARCH—NATIONWIDE—BUY ONE PAIR OF NEW ROCKS MASSAGE SHOES AND GET A FREE PAIR OF ROCKS SANDALS COUPON REQUIRED"

The operator, preferably using the operator interface computer 112, fills in a template 124, which preferably allows him to designate particulars of the TVC. These particulars typically include:
- a designation of the stores for which the TVC marketing campaign is to be relevant. A typical store designation is "Nationwide—all shoe stores";
- TVC Type, such as:
  - Coupon;
  - Loyalty Card;
  - Voucher;
  - Gift Card;
  - Prepaid Card;
- TVC Validity Conditions:
  - Validity duration—start time and date and end time and date;
- Profile of TVC addressees, for example
  - Age; and
  - Gender.

As seen in FIG. 3B, at least one of the operator interface computer 112, the TVCMMPS 110 and the ERP servers 116 preferably automatically carries out the following functions:

1. Ascertains, based on prior definitions, which stores, nationwide, stock ROCKS shoes;
2. Prepares TVC data 126, which is preferably output by TVCMMPS 110, including:

TVC-specific POS set up instructions 128 to the at least one POS configuration server 104 to configure the MPC-enabled POS devices 102, nationwide, in stores which stock ROCKS shoes to give effect to the sales price during the period of the sale set forth in the campaign description 122; and TVC-specific mobile set up instructions 130 to the MPC-equipped mobile device configuration server 106 to communicate the TVC data to selected ones of the multiplicity of MPC wallet-equipped mobile devices 100.

The TVC-specific mobile set up instructions 130 preferably include:
an advertising message, announcing the sale, typically:

"SPECIAL 1-FOR-1 SALE

ALL OF MARCH—NATIONWIDE

BUY ONE PAIR OF NEW

ROCKS MASSAGE SHOES

GET A FREE PAIR OF ROCKS SANDALS

COUPON REQUIRED" and a coupon generation instruction to the MPC-equipped mobile device configuration server 106 to communicate a coupon issuance instruction to selected ones of the multiplicity of MPC wallet-equipped mobile devices 100.

In accordance with a preferred embodiment of the present invention, the POS configuration server 104 receives instructions 128 from TVCMMPS 110 and transmits relevant TVC POS configuration data 132 to MPC-enabled POS devices 102 to be TVC "tap ready". As seen in FIG. 3C, upon completion of data transfer, preferably a MPC-enabled POS device 102 displays a suitable message, such as:

"ROCKS SHOES SALE TAP READY"

thereby notifying the cashier that the new TVC has been set up on MPC-enabled POS device 102 and is tap-ready.

In accordance with a preferred embodiment of the present invention, TVCMMPS 110 preferably receives personal parameter information, such as gender and age, regarding the subscribers of multiplicity of MPC wallet-equipped mobile devices 100 from suitable databases, such as loyalty card databases, social networks and mobile operator databases.

In accordance with a preferred embodiment of the present invention, MPC-equipped mobile device configuration server 106 also receives TVC-specific mobile set up instructions 130 sent from TVCMMPS 110 and further communicates an advertising message 134 announcing the sale to MPC wallet-equipped mobile devices 100. Generation of this message preferably also employs the above-described current information about the availability of the products which are offered in the marketing campaign, which is preferably made available by the merchant ERP system 116.

Upon receipt of the advertising message 134, the MPC wallet-equipped mobile device 100 may display it on its display, as shown in FIG. 3D:

"SPECIAL 1-FOR-1 SALE

ALL OF MARCH NATIONWIDE

BUY ONE PAIR OF NEW

ROCKS MASSAGE SHOES

GET A FREE PAIR OF ROCKS SANDALS

COUPON REQUIRED"

In accordance with a preferred embodiment of the present invention, for example, if the ROCKS MASSAGE shoes or ROCKS SANDALS are out of stock, an update message may be sent out or be made available to advise the customer so as to avoid disappointment. It is appreciated that in this way, a marketing campaign may be managed in near real time.

Figure 3E:
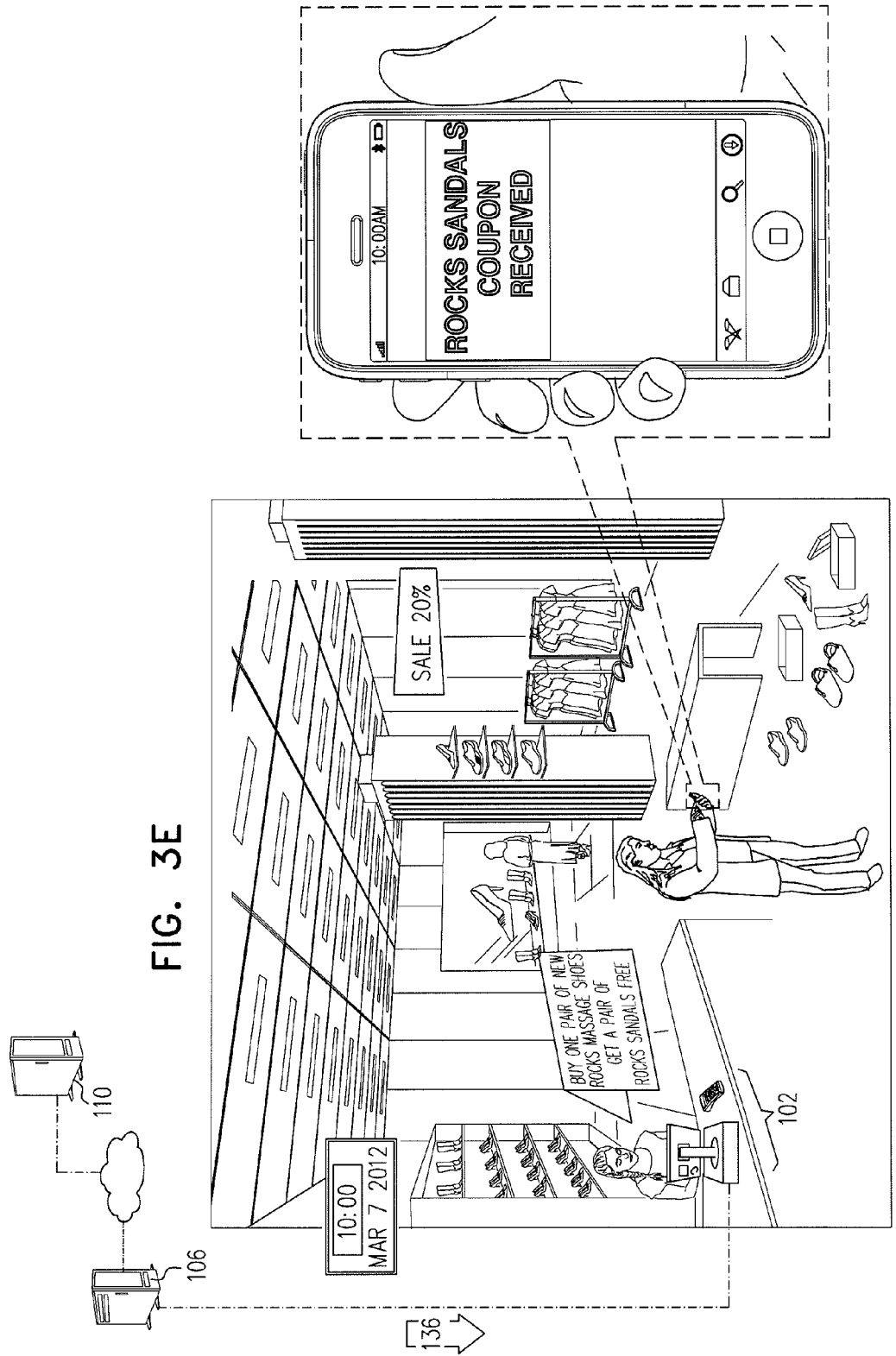

When a customer wishes to download a TVC coupon to be stored at the MPC wallet-equipped mobile device 100, he may click the "coupon" button, as seen in FIG. 3D. In response, as seen in FIG. 3E, a coupon issuance instruction 136 is automatically downloaded from MPC-equipped mobile device configuration server 106 to MPC wallet-equipped mobile device 100 and the MPC wallet-equipped mobile device 100 preferably displays a suitable message, such as:

"ROCKS SANDALS COUPON RECEIVED".

Figure 3F:
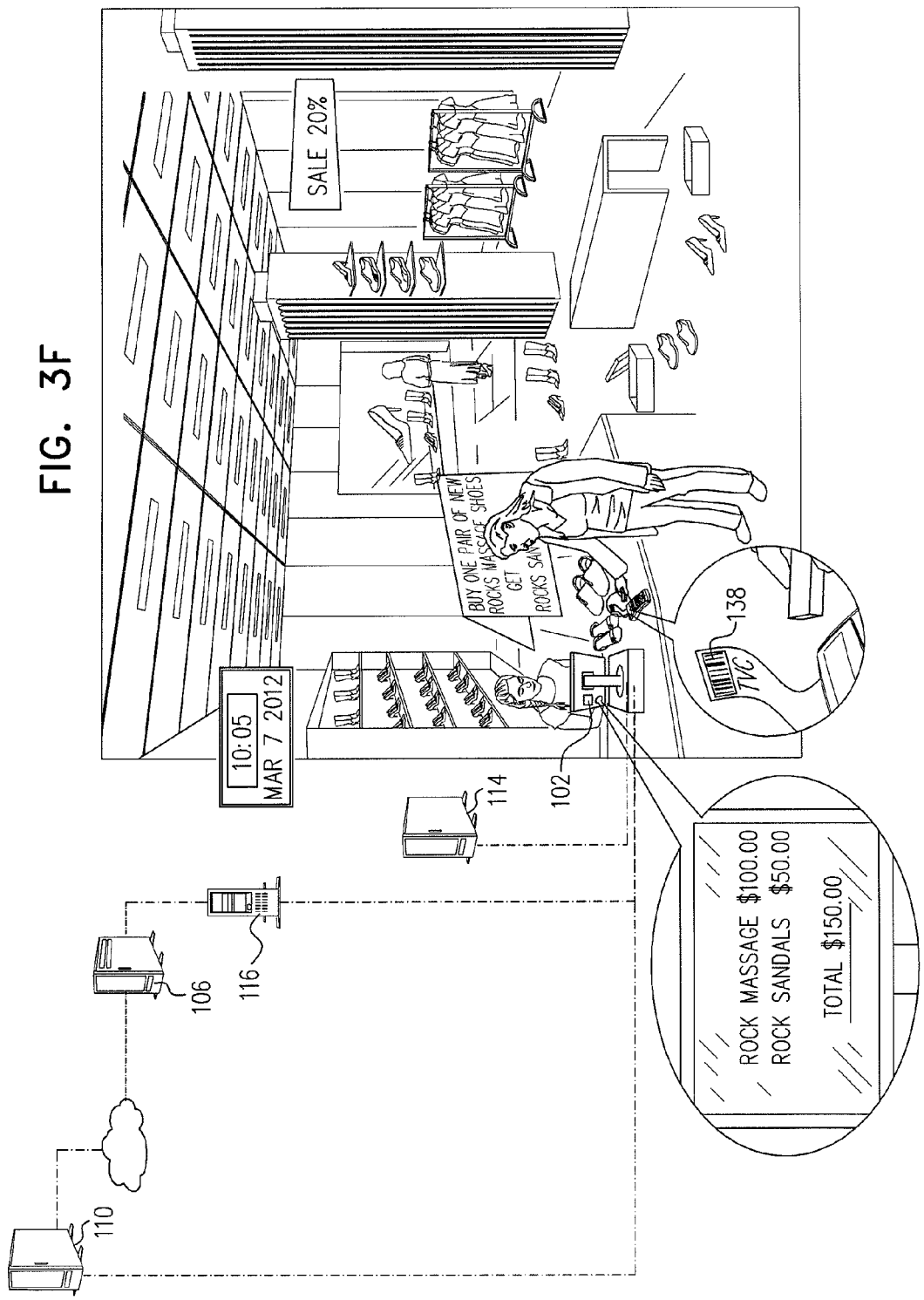

As shown in FIG. 3F, typically when the customer wishes to pay, the cashier enters the non-discounted purchase price and this non-discounted price is displayed, e.g. "ROCKS MASSAGE $100.00; ROCKS SANDALS: $50.00, TOTAL: $150". The customer then taps his MPC wallet-equipped mobile device on the MPC-enabled POS device 102.

As described hereinabove, in the third scenario, MPC-enabled POS device 102 includes an ECR not connected to a payment terminal. Accordingly, following tapping, a TVC barcode 138 is printed using the payment terminal printer, as seen in FIG. 3F.

Figure 3G:
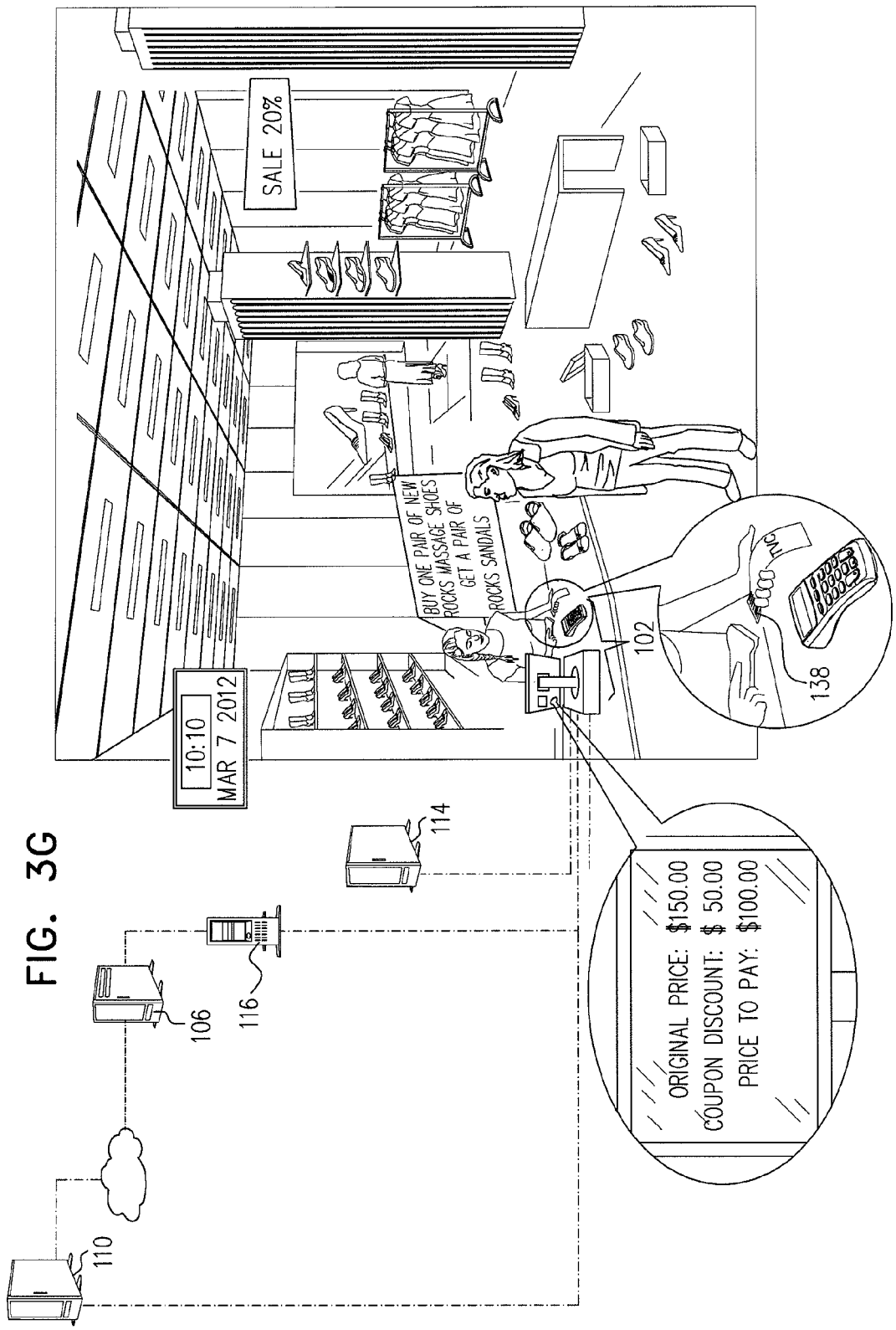

The cashier scans the printed TVC barcode using the ECR scanner, as seen in FIG. 3G. Upon inputting the TVC barcode to the ECR, the TVC discount of $50.00 for free ROCKS SANDALS is applied to the transaction, provided that ROCKS MASSAGE shoes are being purchased. If so, the discounted price of $100.00 is displayed to the customer, as shown in FIG. 3G. It is appreciated that communication between the MPC-enabled POS devices 102 and the performance monitor server 114 is preferably employed for TVC daily purchase limit validity management.

The customer is preferably requested once again to tap his MPC wallet-equipped mobile device 100 on the MPC-enabled POS device 102 in order to complete the purchase transaction in a manner typical of conventional payment card purchase transactions, such as via communication with a payment card transaction processor (not shown), customer signature and issuance of a receipt (not shown). Data regarding one or more TVCs actually involved in the transaction are transmitted by the MPC-enabled POS device 102 to a performance monitor server 114 and preferably also to TVCMMPS 110, as described in greater detail hereinbelow.

It is appreciated that alternatively, the initial tap may take place prior to entry by the cashier of the non-discounted purchase price. As a further alternative, only a single tap may be carried out in order to both transfer TVC coupon data and to transfer payment card data to cause the MPC-enabled POS device 102 to communicate the amount paid and the payment card data to the transaction processor and thus complete the purchase transaction.

Figure 4:
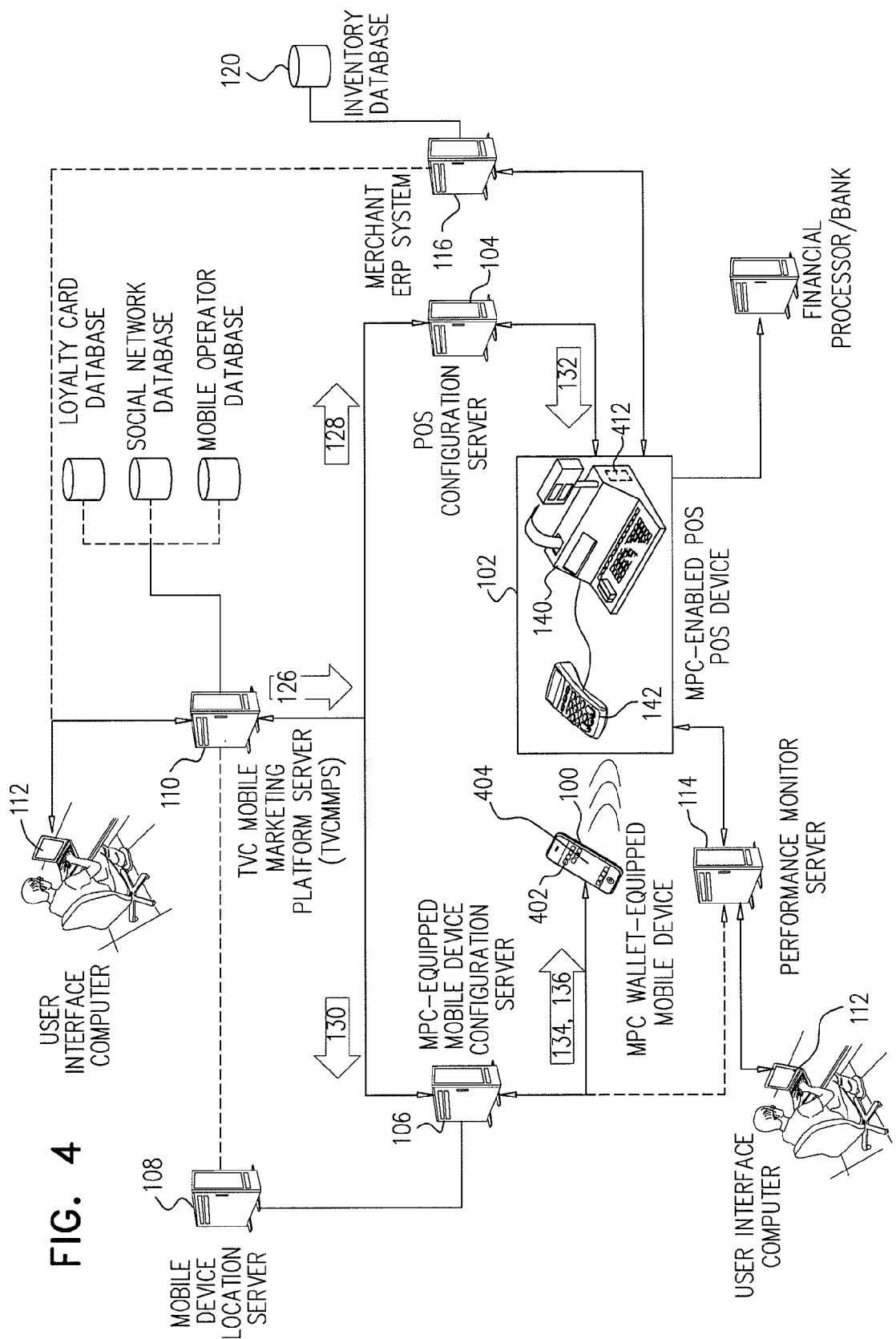
FIG. 4 is a simplified illustration of a mobile commerce system constructed and operative in accordance with a preferred embodiment of the present invention.

Reference is now made to FIG. 4, which is a simplified illustration of a computerized mobile commerce system constructed and operative in accordance with a preferred embodiment of the present invention, examples of the operation of which are described hereinabove.

As seen in FIG. 4, the computerized mobile commerce system preferably includes a multiplicity of MPC wallet-equipped mobile devices 100 (FIGS. 1A-3G), such as mobile communicators operating on an ANDROID®, iOS®, BLACKBERRY® or WINDOWS MOBILE® operating system.

It is a particular feature of the present invention that at least one TVCMMPS 110 is provided to introduce selectable marketing functions and to communicate both with at least one POS configuration server 104 and at least one MPC-equipped mobile device configuration server 106 to coordinate operation thereof so that MPC-enabled POS devices 102 will be "tap-ready" for carrying out selected marketing functions. TVCMMPS 110 preferably is operated by at least one operator employing at least one operator interface computer 112.

In accordance with a preferred embodiment of the present invention, the TVCMMPS 110 provides at least the following TVC-related functions:

Receiving TVC data and customer profiles from at least one of operator interface computer 112 and Merchant ERP system 116;

Communication to at least one POS configuration server 104 of TVC parameters to be downloaded to the MPC-enabled POS devices 102 and TVC-related instructions to configure the MPC-enabled POS devices 102 to process TVC parameters;

Communication to at least one MPC-equipped mobile device configuration server 106 of TVC parameters, inventory data and promotion data to be downloaded to selected ones of the multiplicity of MPC wallet-equipped mobile devices 100 and TVC-related instructions to configure the MPC wallet-equipped mobile devices 100 to process TVC parameters;

Conducting operator initiated TVC database searches, such as searches for TVCs by product, geographical area, merchant and store; and Generation and Modification of TVCs.

Generation of TVCs typically requires that the operator select at least the following parameters:

ID of Promotor, for example "J&Jeans" as in the Scenario of FIGS. 1A-1H;

ID of Promotion, for example "3564-3";

Title of Promotion, for example:

"Special Sale XYZ JEANS"

A marketing campaign description, typically: "SPECIAL SALE NOON—6 PM TODAY 50% OFF ALL XYZ JEANS—MIDTOWN MANHATTAN STORES—COUPON REQUIRED";

A preferably personalized, preferably location-based advertising message, announcing the sale, typically:

"SPECIAL SALE XYZ JEANS TODAY 12 NOON TO 6 PM 50% OFF

AT THE STORE CLOSEST TO YOU NOW AT . . . , WE HAVE YOUR SIZE . . . IN THE FOLLOWING COLORS: . . . .

AT THE NEXT CLOSEST STORE IN THE DIRECTION YOU ARE TRAVELLING, AT . . . , WE HAVE YOUR SIZE . . . IN THE FOLLOWING COLORS: . . . .

CLICK FOR COUPON

CLICK HERE FOR REAL TIME INVENTORY UPDATE"

TVC Type—The operator typically selects one of the following TVC Types:
Coupon;
Loyalty Card;
Voucher;
Gift Card;
Prepaid Card;
Negative Value (Bill Payment);
TVC Validity Conditions:
Validity duration—start time and date and end time and date;
Retail outlets at which TVC is valid;
Addition validity conditions, for example:
  first 1000 customers per day; or
  5 purchases per customer;
Profile of TVC addressees, for example
Age;
Gender;
Shopping Preferences;
Location;
TVC data path definitions, for example:
To the wallet, one or more of the following:
  Via Mobile Device Configuration Server 106;
  Via POS configuration server 104 and MPC-enabled POS device 102;
  Via a smart poster 2D barcode photographed by camera of wallet-equipped Mobile device 100;
To the MPC-enabled POS 102, one or more of the following:
  Via POS Configuration Server 104;
  Via MPC wallet-equipped Mobile device 100;
  Via Additional Server (via Internet);
TVC categories, for example, the category of goods and services to which the TVC relates, such as in the scenario of FIGS. 1A-1H, the category may be casual clothing.
TVC data display instructions on wallet-equipped mobile device 100 display, for example:
Font and size of characters;
Type of characters, such as bold, underline, Italics; and
Position of images.
As part of the Generation of TVCs and in response to the operator-inputted parameters mentioned above, the TVCMMPS 110 preferably provides TVC IDs and TVC barcodes such as barcode 138 (FIGS. 3F & 3G). There may be separate TVC IDs and TVC barcodes for each TVC sent to each MPC wallet-equipped mobile device 100 or alternatively a single barcode for each promotion or for each product. As another alternative, different TVC IDs and TVC barcodes may be provided for different point of sale devices, different stores and/or different merchants where the TVCs are valid and may reflect different TVC validity conditions for different point of sale devices, different stores and/or different merchants.
Modification of TVCs typically requires that the operator select at least the following modification parameters:
Change Validity Duration—for example, change end time and date;
Change Retail outlets at which TVC is valid;
Change Validity Conditions, for example:
first 2000 customers per day; or
10 purchases per customer;
Change Profile of TVC addressees, for example
Age;
Gender;
Shopping Preferences; and
Location.

At least one MPC-equipped mobile device configuration server 106 is provided for configuring the plurality of MPC wallet-equipped mobile devices 100. In accordance with a preferred embodiment of the present invention, the at least one MPC-equipped mobile device configuration server 106 provides one and preferably multiple ones of the following functions:
  communicating with TVCMMPS 110 to receive TVC data, including TVC-specific mobile set up instructions 130, activation and deactivation of TVCs;
  updating MPC wallet-equipped mobile devices 100;
  updating a MPC wallet-equipped mobile device subscriber database;
  downloading applications such as payment and TVC applications to the MPC wallet-equipped mobile devices 100;
  ascertaining the location of the MPC wallet-equipped mobile devices 100;
  downloading TVC promotion data, for example including personalized and location based promotion data, to MPC wallet-equipped mobile devices 100;
  communicating with TVCMMPS 110 to receive TVC-related instructions for configuring MPC wallet-equipped mobile devices 100 to process TVC parameters;
  selecting MPC wallet-equipped mobile device subscribers to receive downloads of TVC data based, for example on profiles of customers to whom TVC data is to be downloaded, inventory status, subscriber location and pre-set limits;
  downloading TVC transaction data to MPC wallet-equipped mobile devices 100; and
  providing reports to performance monitor server 114 on TVC promotions and downloads of TVC transaction data to MPC wallet-equipped mobile devices 100.

The TCP-equipped mobile devices 100 preferably include one or more wallet software module 402, preferably pre-installed in the MPC wallet-equipped mobile devices 100. The software module 402 preferably includes all or part of one or more Transaction Value Certificate (TVC) application and all or part of other applications, such as a conventional credit/debit card transaction application. The term "wallet" as used throughout the specification refers to wallet software module 402.

Optionally, the wallet software module 402 enables the TCP wallet-equipped mobile device 100 to display TVC data on a display 404 thereof in response to a TVC data stream downloaded thereto.

Preferably, some or all of the TCP wallet-equipped mobile devices 100 include a secure element which stores all or part of one or more TVC applications and all or part of one or more other applications such as conventional credit/debit card transaction applications and TVC databases. Examples of suitable secure elements include a SIM card and a SD (Secure Digital) Cards.

The one or more software modules 402 preferably provide one or more of the following functions:
  receiving data streams from at least one MPC-equipped mobile device configuration server 106 for configuring the mobile device to be able to implement a future TVC;
  receiving data streams from a MPC-enabled POS device 102 prior to, during and following implementation of a TVC;
  transmitting data streams associated with TVCs to a MPC-enabled POS device 102, to other MPC wallet-equipped mobile devices via any suitable communication link, such as BLUETOOTH® NFC and WI-FI;

sharing, transferring, trading, buying, selling and/or cancelling coupons;

storing TVC data;

presenting TVC data on a display 404 of a MPC wallet-equipped mobile device 100;

conducting customer initiated TVC database searches, such as searches for TVCs by product, geographical area and store; and communicating with Mobile Device Location Server 108.

It is also appreciated that the mobile device may carry out wholly or partially conventional functions, such as downloading TVC data from posters, using a bar code reader or a camera.

The data stored in the software module 402 for each TVC preferably includes the following:

ID of Promotor, for example "J&Jeans" as in the Scenario of FIGS. 1A-1H;

ID of Promotion, for example "3564-3";

Title of Promotion, for example: "Special Sale XYZ JEANS"

Marketing campaign description, for example: "SPECIAL SALE NOON—6 PM TODAY 50% OFF ALL XYZ JEANS—MIDTOWN MANHATTAN STORES—COUPON REQUIRED";

TVC Type, one of the following:

Coupon;

Loyalty Card;

Voucher;

Gift Card;

Prepaid Card;

Negative Value (Bill Payment);

TVC Validity Conditions:

Validity duration—start time and date and end time and date;

Retail outlets at which TVC is valid;

Addition validity conditions, for example:

first 1000 customers per day; or 5 purchases per customer;

TVC data path definitions, for example:

Via Mobile Device Configuration Server 106;

Via POS configuration server 104 and MPC-enabled POS device 102;

Via a smart poster 2D barcode photographed by camera of mobile device 100;

TVC categories, for example, the category of goods and services to which the TVC relates, such as in the scenario of FIGS. 1A-1H, the category may be casual clothing.

TVC data display instructions, for example:

Font and size of characters;

Type of characters, such as bold, underline, Italics; and

Position of images.

Optionally, wallet software module 402 may also store TVC barcodes. Preferably, prioritization data may also be stored in wallet software module 402 for determined priorities of display of TVC data to a customer and/or communication of TVC data to a MPC-enabled POS device 102.

At least one POS configuration server 104, such as a suitably modified VERIX® server commercially available from Verifone, Inc., is operative for configuring the plurality of MPC-enabled POS devices 102.

POS configuration server 104 preferably includes one or more software modules which provide one or more of the following functions:

receiving data streams from at least one TVCMMPS 110 for configuring MPC-enabled POS devices 102 to implement a TVC;

receiving data streams from MPC-enabled POS devices 102 prior to, during and following implementation of TVC transactions;

downloading of software modules 412, such as payment software modules, sales software modules, inventory control and TVC software modules, to MPC-enabled POS devices 102;

configuring, initializing and downloading POS identification, location and operation parameters to MPC-enabled POS device 102;

receiving TVC-specific POS set up instructions 128 from TVCMMPS 110;

communicating with TVCMMPS 110 to receive TVC-related instructions for configuring MPC-enabled POS devices 102 to process TVC parameters; and selecting to which MPC-enabled POS devices 102 TVCs should be distributed.

It is appreciated that in the illustrated embodiment of the present invention, the POS configuration server 104 preferably also provides conventional POS terminal and ECR configuration functions such as those currently provided by conventional POS configuration servers and ECR configuration servers such as VERIX® and NURIT®CC.

The computerized mobile commerce system includes a plurality of MPC-enabled POS (point of sale) devices 102. The MPC-enabled point of sale devices 102 include one or more of electronic cash registers (ECRs) 140, payment terminals 142, such as model MX® 915 commercially available from Verifone, Inc., pin pads, and MPC-enabled readers such as model QX, commercially available from Verifone, Inc. which may be fully or partially integrated and/or interconnected.

Where multiple MPC-enabled point of sale devices 102 are integrated, POS configuration server 104 may govern the integrated operation thereof. Where the multiple MPC-enabled point of sale devices 102 are not fully integrated, for example when a cash register 140 is not integrated with a payment terminal 142, the operation of the cash register may be governed by an ERP server 116 and the operation of the payment terminal 142 may be governed by POS configuration server 104.

As noted above, software modules 412 preferably are downloaded to and reside in the TCP-equipped POS devices 102. The software modules 412 enable the MPC-enabled POS devices 102 to carry out at least one and preferably more than one of the following functions:

receiving data streams from at least one POS configuration server 104 for configuring the MPC-enabled POS device 102 to be tap ready for implementation of a TVC;

receiving data streams from a MPC wallet-equipped mobile device 100 prior to, during and following implementation of a TVC;

receiving at least some TVC data from another source, such as the Cloud;

transmitting data streams associated with TVCs to a MPC wallet-equipped mobile device 100, to other MPC-enabled POS devices via any suitable communication link, such as BLUETOOTH® NFC and WI-FI;

storing TVC data on one or more MPC-enabled POS devices 102, store server or other server;

presenting TVC data on a display of a MPC-enabled POS devices 102;

communicating TVC related data to one or more monitor server 114 and/or to one or more store server; and conducting merchant initiated TVC database searches, such as searches for TVCs by product, geographical area and store.

It is also appreciated that the MPC-enabled POS devices 102 may carry out wholly or partially conventional functions, such as payment card transactions, bar code reading and inventory control reporting.

It is appreciated that the ERP server 116 may provide one or more of the following TVC-related functionalities:

downloading to ECRs 140, TVC associated software modules 412, such as:
software modules which enable receipt of data streams from MPC-enabled payment terminal 142;
software modules which enable reporting to MPC-enabled payment terminal 142 on used and unused TVCs;
display of relevant TVCs for a specific customer and/or sale; and
selection of specific TVCs to be used in a specific transaction.

The ECR 140 is preferably operative to carry out at least one and preferably more than one of the following functions:
receiving TVC data, specifically TVC barcodes, from MPC-enabled payment terminal 142; and
reporting TVC data, specifically barcodes of used and/or unused TVCs, to at least one of MPC-enabled payment terminal 142, ERP configuration server 116 and TVC-MMPS 110.

The MPC-enabled payment terminal 142 is preferably operative to carry out at least one and preferably more than one of the following functions:
all of the functions of MPC-enabled payment terminal 102, other than those carried out by ECR 140, and also providing TVC data, specifically TVC barcodes, to ECR 140; and
receiving TVC data, specifically barcodes of used and/or unused TVCs.

In systems where ECR 140 and MPC-enabled payment terminal 142 are interconnected, MPC-enabled payment terminal 142 may communicate a relevant TVC barcode to ECR 140. In systems where ECR 140 and MPC-enabled payment terminal 142 are not interconnected, the relevant barcode is printed by a printer of MPC-enabled Payment terminal 142 and inputted to the ECR 140 using a barcode scanner, as shown for example in FIGS. 3G and 3H. When MPC-enabled payment terminal 142 and ECR 140 are not interconnected, the MPC-enabled payment terminal 142 selects which TVC barcodes to print.

The at least one performance monitor server 114 preferably monitors TVC transactions carried out by the MPC-enabled POS devices 102, provides a TVC clearing function, such as redemption record keeping, and provides desired overall sales performance reporting statistics based on data received from MPC-enabled POS devices 102.

The performance monitor server 114 preferably provides reports of multiple transactions to various interested parties, such as merchants, manufacturers and advertisers. These reports may be arranged for example by TVC and/or according to various selectable customer profiles.

Performance monitor server 114 may also receive data from Mobile Device Configuration Server 106 indicating customers interested in a specific TVC. This enables the Performance Monitor Server 114 to report statistics on the success of a TVC campaign and statistics regarding the customers using a given TVC, according to demographic or other relevant criteria.

The Performance Monitor Server 114 preferably provides reports of multiple transactions to various interested parties, such as merchants, manufacturers and advertisers. These reports may be arranged for example by TVC and/or according to various selectable customer profiles.

Performance Monitor Server 114 preferably includes one or more software modules which enables it to:
communicate with POS configuration server 104 and receive updates regarding usage of a TVC;
communicate with a wallet issuer and provide updates of usage of a TVC; and
enable operators to review TVC usage details, statistics and reports on specific TVCs and groups of TVCs.

Figure 5:
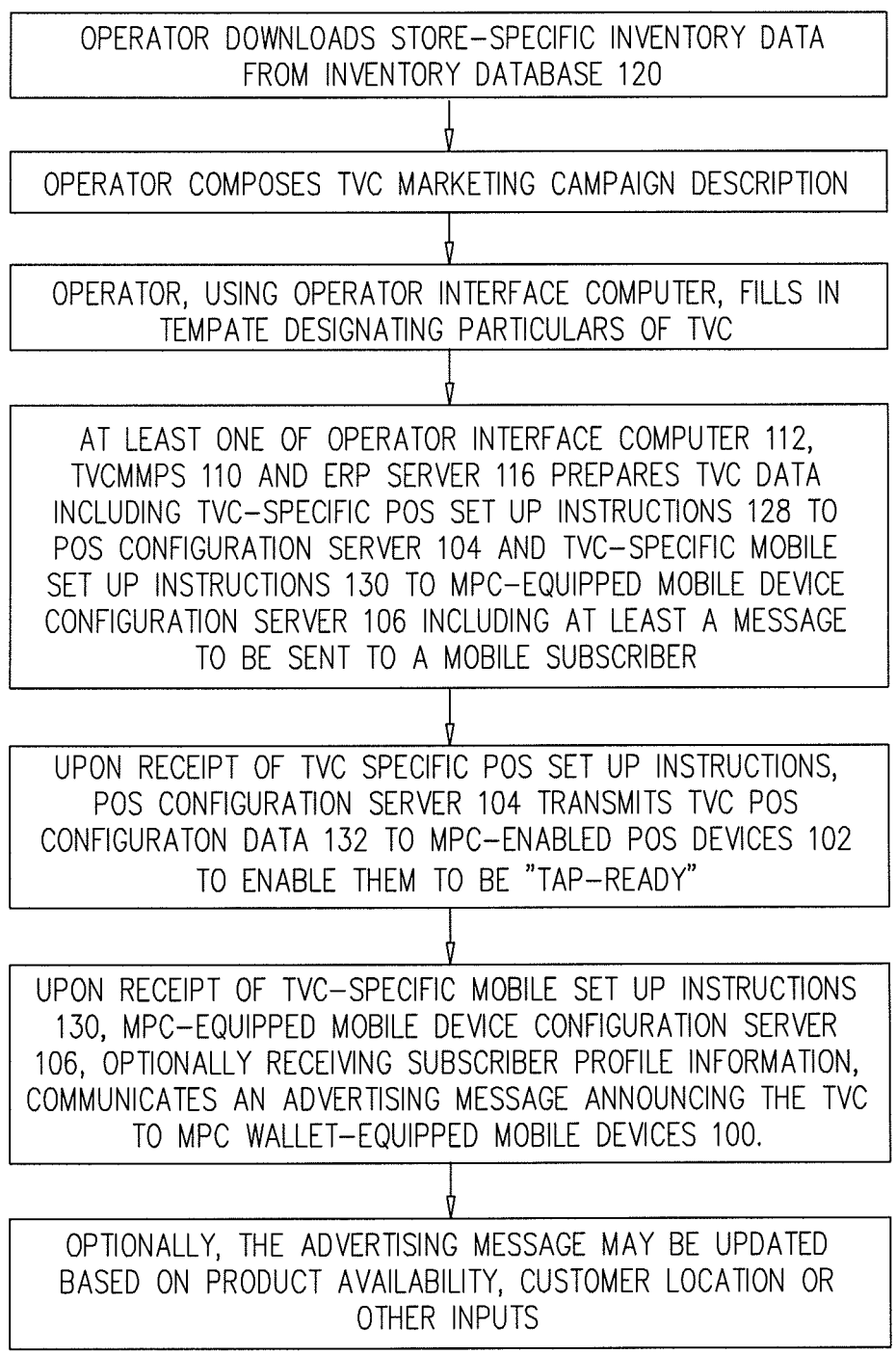
FIG. 5 is a simplified flow chart generally illustrating generation and communication of TVCs in accordance with embodiments of the present invention.

Reference is now made to FIG. 5, which is a simplified flow chart generally illustrating generation and communication of TVCs in accordance with embodiments of the present invention.

As seen in FIG. 5, preferably, the operator downloads inventory data from an inventory database and composes a TVC marketing campaign description. Using the operator interface computer 112, the operator inputs data to the TVC-MMPS 110 enabling it to preferably automatically generate TVC data, including TVC-specific POS set up instructions 128 to POS configuration server 104 and TVC-specific mobile set up instructions 130 to MPC-equipped mobile device configuration server 106, including at least a message to be sent to mobile subscribers.

Upon receipt of TVC-specific POS set up instructions, the POS configuration server 104 transmits TVC POS configuration data 132 to MPC-enabled POS devices 102 to enable them to be "tap-ready".

Upon receipt of TVC-specific mobile set up instructions 130, MPC-equipped mobile device configuration server 106, optionally receiving subscriber profile information, communicates an advertising message announcing the TVC to MPC wallet-equipped mobile devices 100.

Optionally, the advertising message may be updated based on product availability, customer location or other inputs.

Figure 6:
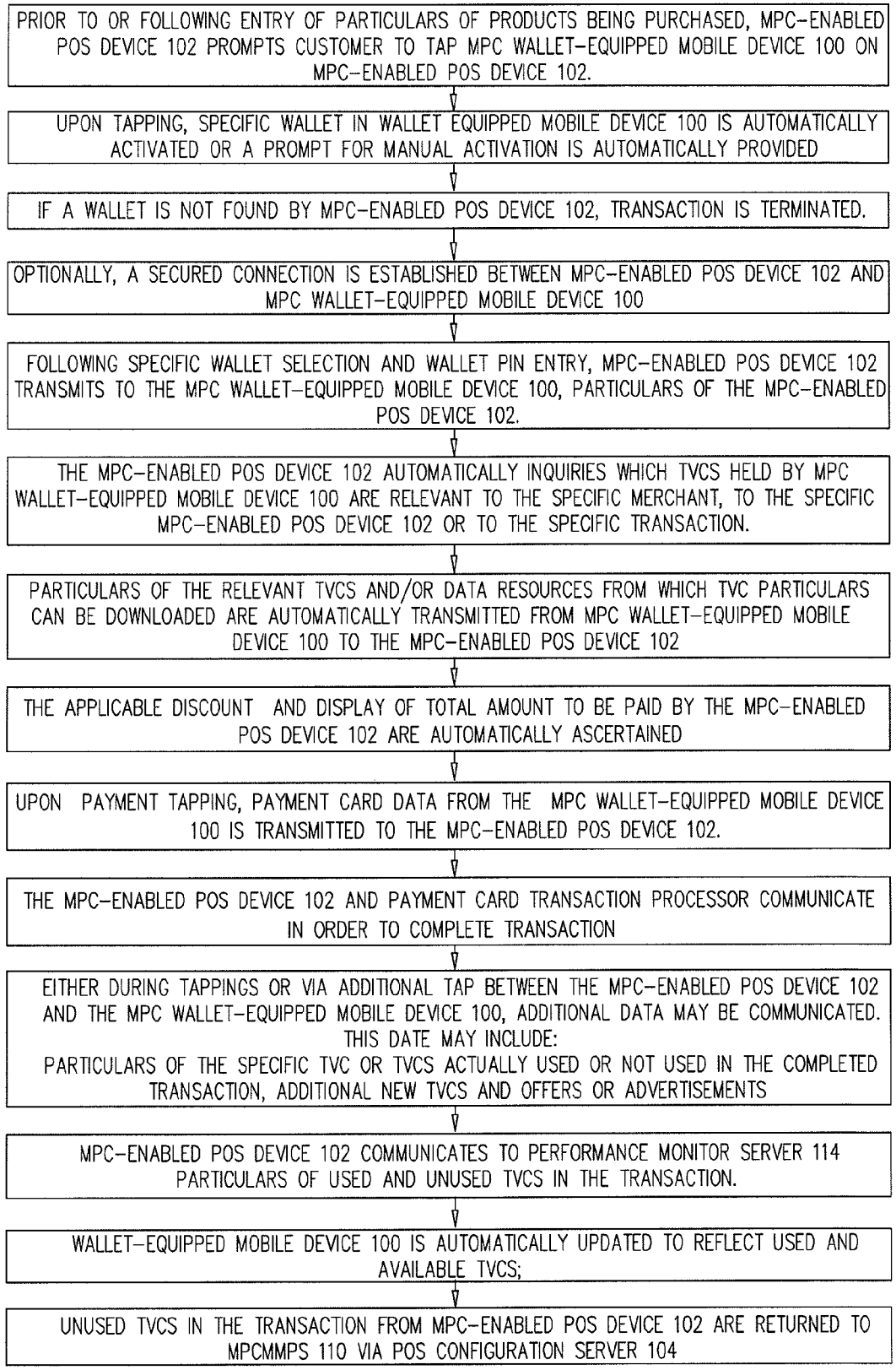
FIG. 6 is a simplified flow chart illustrating various aspects of the operation of the mobile commerce system shown in FIGS. 1A-3G.

Reference is now made to FIG. 6, which is a simplified flow chart illustrating the use of TVCs in a wallet transaction.

Turning to FIG. 6, it is seen that before, during or following entry by the cashier of the particulars of products being purchased into the MPC-enabled POS device 102 (FIG. 1H), the MPC-enabled POS device 102 prompts the customer to tap his MPC wallet-equipped mobile device 100 on the MPC-enabled POS device 102.

Before tapping, the customer may activate a specific wallet by pressing on a corresponding specific wallet icon on the display of the wallet equipped mobile device. Alternatively, a specific wallet may be automatically activated in the course of tapping.

When the customer taps his MPC wallet-equipped mobile device 100, without having first activated a specific wallet, the MPC-enabled POS device 102 attempts to handshake with an unactivated wallet in MPC wallet-equipped mobile device 100. If a single wallet is found, it is activated automatically. If the MPC-enabled POS device 102 finds more than one unactivated wallet, it requests the customer to choose which wallet is to be used and thereby manually activate the selected wallet. If the MPC-enabled POS device 102 does not find a wallet, the transaction is terminated.

Optionally, a secured connection is established between MPC-enabled POS device 102 and MPC wallet-equipped mobile device 100 and if required, authentications and key exchange is performed at this step.

Once a specific wallet is selected, and the customer keys in a wallet opening PIN into the MPC wallet-equipped mobile device 100, the MPC-enabled POS device 102 transmits to the MPC wallet-equipped mobile device 100 particulars of the MPC-enabled POS device 102, such the relevant merchant ID, the store location and the operative configuration of the MPC-enabled POS device 102. It is understood that this and subsequent communications are carried out within a specific wallet application residing in the MPC wallet-equipped mobile device 100 which effectuates the relevant wallet.

The MPC-enabled POS device 102 then automatically asks the MPC wallet-equipped mobile device 100 to indicate which TVCs held by it are relevant to the specific MPC-enabled POS device 102.

In response, the MPC wallet-equipped mobile device 100 automatically transmits to the MPC-enabled POS device 102, particulars of the relevant TVCs and, for each TVC, a transaction specific identifier, TSI.

Selection of the relevant TVCs may include prioritization thereof.

If some of the particulars of the relevant TVCs are not resident on the MPC wallet-equipped mobile device 100, the TVC particulars that are transmitted by the MPC wallet-equipped mobile device 100 to the MPC-enabled POS device 102 include particulars of data resources from which additional TVC particulars can be downloaded by the MPC-enabled POS device 102.

An example of such additional TVC particulars relates to a case wherein a TVC is only applicable to the first 1000 purchasers of a product per day, as in the scenario described above with reference to FIGS. 2A-2H. In such a case, exceedence of the current count of purchasers must be ascertained by communication with performance monitor server 114 (FIG. 4).

Alternatively, prior to transmission of the relevant TVCs, the relevant TVCs for the specific merchant are displayed on the MPC wallet-equipped mobile device 100, and the customer selects those he wishes to use and then again taps his MPC wallet-equipped mobile device 100 on MPC-enabled POS device 102 for transmission of the selected TVCs. In another variation, the TVCs are displayed on the display of the MPC-enabled POS device 102 and the cashier requests customer selection of the TVCs to be used in the specific sale.

As a further alternative, communication between MPC wallet-equipped mobile device 100 and the MPC-enabled POS device 102 enables the MPC-enabled POS device 102 to ascertain whether the MPC wallet-equipped mobile device 100 contains any TVCs which are specifically relevant to the specific products being purchased in the current transaction. In such a case, only specific product relevant TVCs are automatically transmitted from the MPC wallet-equipped mobile device 100 to the MPC-enabled POS device 102.

Based on the communicated TVCs, the MPC-enabled POS device 102 ascertains the applicable discount to the purchase price of the products and displays it to the customer together with the final payment amount, as seen for example in FIG. 1G, and prompts the customer to again tap his MPC wallet-equipped mobile device 100 to confirm the displayed final payment amount.

In the course of this payment tap, which completes the payment transaction, payment card data is transferred from the MPC wallet-equipped mobile device 100 to the MPC-enabled POS device 102. If no such data is transferred, the customer is prompted by the MPC-enabled POS device 102 to pay in another manner.

Alternatively, only a single tap may be carried out in order to both transfer TVC coupon data and to transfer payment card data to cause the MPC-enabled POS device 102 to communicate the amount paid and the payment card data to the transaction processor and thus complete the purchase transaction.

Remaining conventional steps in a payment card transaction, such as communication with payment card transaction processor, customer signature and issuance of a receipt may occur in the normal manner.

In accordance with embodiments of the present invention communication between the MPC-enabled POS device 102 and the MPC wallet-equipped mobile device 100 may also include:

communication from the MPC-enabled POS device 102 communicates to the MPC wallet-equipped mobile device 100 of particulars of the specific TVC or TVCs actually used or not used in the completed transaction. For example, if a customer wishes to purchase a shirt at J&JEANS store, as presented in the first scenario, and the customer's wallet includes a TVC for XYZ Jeans, which is relevant to that merchant, but not used in the sale, the XYZ Jeans TVC may be returned to the customer's wallet, since it was not used. Alternatively, unused TVCs may be returned from the MPC-enabled POS device 102 to the MPC wallet-equipped mobile device 100 via communication with MPC-equipped mobile device configuration server 106;

communication of additional TVCs from the MPC-enabled POS device 102 to the MPC wallet-equipped mobile device 100; and communication of offers or other advertisements, for the same retail chain or a different retail chain, to be displayed on the MPC wallet-equipped mobile device 100.

The MPC-enabled POS device 102 communicates to the Performance Monitor server 114 particulars of the specific TVC or TVCs actually used and those unused in the transaction.

Following completion of the transaction, the following updating functions are preferably carried out:

the selected wallet in the wallet-equipped mobile device 100 is updated to reflect unused and available TVCs;

the MPC-enabled POS device 102 communicates particulars of the transaction and of the TVCs used therein to performance monitor server 114; and the MPC-enabled POS device 102 communicates to MPC-MMPS 110 via POS configuration server 104 particulars of the transaction and of the TVCs unused therein that are to be wirelessly communicated to the wallet-equipped mobile device 100.

It is appreciated that by limiting the number of TVCs communicated from the MPC wallet-equipped mobile device 100 to the MPC-enabled POS device 102 to the TVCs which are relevant to a given transaction, the communication bandwidth required for transmission of the TVCS from the MPC wallet-equipped mobile device 100 to the MPC-enabled POS device 102 and for transmitting unused TVCs from the MPC-enabled POS device 102 to the MPC wallet-equipped mobile device 100 is correspondingly limited.

It is appreciated that all or part of POS configuration server 104 functionalities may be incorporated in MPCMMPS 110.

It is further appreciated that TCP-enabled POS device 102 may communicate directly with MPCMMPS 110.

It is also appreciated that all or part of the functionalities of mobile device configuration server 106 may be incorporated in MPCMMPS 110.

It is further appreciated that MPC wallet equipped mobile device 100 may communicate directly with MPCMMPS 110.

It will be appreciated by persons skilled in the art that the present invention is not limited by what has been particularly shown and described hereinabove. Rather the scope of the present invention includes both combinations and subcombinations of features recited in the claims as well as modifications thereof which would occur to a person of ordinary skill in the art upon reading the foregoing and which are not in the prior art.

The invention claimed is:

1. A mobile commerce system comprising:
   a first multiplicity of Transaction Value Certificate (TVC) wallets operative in conjunction with a second multiplicity of Mobile Device-Point of Sale Communication (MPC)-equipped mobile devices;
   a third multiplicity of MPC-enabled Point-of-Sale (POS) devices operated by a first plurality of unaffiliated retailers, said third multiplicity of MPC-enabled POS devices having TVC wallet interface functionality and being configurable by a second plurality of POS configuration servers;
   at least one TVC wallet configuration server for configuring said first multiplicity of TVC wallets; and
   at least one mobile marketing platform server operative to introduce Transaction Value Certificate (TVC)-related functions which are used to coordinate operation of said second plurality of POS configuration servers and said at least one TVC wallet configuration server,
   whereby:
   a first set of TVC offer data is stored in at least one of said first multiplicity of TVC wallets;
   a second set of TVC offer acceptance data is pre-stored in said third multiplicity of MPC-enabled POS devices, prior to a TVC transaction and prior to communication between said MPC-enabled POS devices and said MPC-equipped mobile devices;
   a first selected subset of said first set of TVC offer data is stored in a TVC wallet of a first selected customer;
   a second selected subset of said second set of TVC offer acceptance data is stored in a selected one of said third multiplicity of MPC-enabled POS devices; and
   when said first selected customer interacts with said selected one of said third multiplicity of MPC-enabled POS devices, interaction between said TVC wallet of said first selected customer and said selected one of said third multiplicity of MPC-enabled POS devices identifies at least TVC offer data in said first selected subset which matches TVC offer acceptance data in said second selected subset and enables transactions based thereon, and wherein said TVC offer acceptance data is determined by the manufacturer.

2. A mobile commerce system according to claim 1 and also comprising a performance monitor server operative to receive TVC data from at least one of said third multiplicity of MPC-enabled POS devices and at least one of said second plurality of POS configuration servers and to provide an output indicating parameters of use of TVCs.

3. A mobile commerce system according to claim 1 and wherein at least some of said second multiplicity of MPC-equipped mobile devices are MPC wallet-equipped mobile devices.

4. A mobile commerce system according to claim 1 and wherein said TVC-related functions include at least two of:
   receiving TVC data and customer profiles from at least one of an operator interface computer and a merchant ERP system;
   communicating TVC-related POS configuration server instructions to at least one of said second plurality of POS configuration servers regarding TVC parameters to be downloaded to the third multiplicity of MPC-enabled POS devices;
   communicating TVC-related TVC wallet configuration server instructions to said at least one TVC wallet configuration server regarding TVC parameters, inventory data and promotion data to be downloaded to selected ones of the first multiplicity of TVC wallets;
   conducting operator initiated TVC database searches;
   generating TVCs; and
   modifying TVCs.

5. A mobile commerce system according to claim 4 and wherein:
   said TVC-related POS configuration server instructions include TVC-specific POS set up instructions which are communicated to said at least one of said second plurality of POS configuration servers; and
   said TVC-related TVC wallet configuration server instructions include TVC-specific mobile set up instructions which are communicated to said at least one TVC wallet configuration server.

* * * * *